United States Patent [19]
Bellenger et al.

[11] Patent Number: 5,982,768
[45] Date of Patent: Nov. 9, 1999

[54] DUAL BAND MODEM FOR HIGH BANDWIDTH COMMUNICATIONS

[75] Inventors: Donald M. Bellenger, Los Altos Hills; Steven P. Russell, Menlo Park, both of Calif.

[73] Assignee: 3Com Corporation, Santa Clara, Calif.

[21] Appl. No.: 08/900,320

[22] Filed: Jul. 25, 1997

Related U.S. Application Data

[63] Continuation-in-part of application No. 08/855,052, May 13, 1997.

[51] Int. Cl.$^6$ .................................................. H04L 12/64
[52] U.S. Cl. ........................................... 370/352; 375/222
[58] Field of Search ..................................... 370/493, 494, 370/495, 352, 353, 354, 355, 356, 401, 420, 395, 206, 208, 480, 484, 468, 295; 375/222

[56] References Cited

U.S. PATENT DOCUMENTS

| | | | |
|---|---|---|---|
| 5,237,561 | 8/1993 | Pyhalammi | 375/222 |
| 5,668,857 | 9/1997 | McHale | 379/93.07 |
| 5,719,901 | 2/1998 | Le Riche et al. | 375/222 |
| 5,751,796 | 5/1998 | Scott et al. | 375/222 |

OTHER PUBLICATIONS

Patrick, Dennis R., "The Telecommunications Act of 1996: Intent, Impact and Implications", from website http://www.pff.org/pff/cad/patr051496.html, printed Apr. 29, 1997, 8 pages.

Massey, Tim et al., "DSP Solutions for Telephony and Data/Facsimile Modems" Application Book, Texas Instruments SPRA073, copyright Texas Instruments, Inc., Jan. 1997, pp. 1–102.

"Procedures for Document Facsimile Transmission In The General Switched Telephone Network", Fascicle VII.3–Rec. T.30, former Recommendation T.4, mar del Plata, 1968; amended and renumbered at Geneva, 1976 and 1980, Malaga–Torremolinos, 1984 and Melbourne, 1988.

ANSI Technical Publication T1.413–1995, "Network and Customer Installation Interfaces—Asymmetric Digital Subscriber Line (ADSL) Metallic Interface", approved Aug. 18, 1995, copyright American National Standards Institute, Inc., New York, 1995, pp. 1–166.

SGS–Thomson Microelectronics Technical Publication ST7544, Universal Modem Analog Front–End (UMAFE), published Jun. 1995, pp. 1–50.

Brownlie, J.,"Draft Text of Recommendation V.8 (V.id) Proposed for Resolution 1, Point 8 Application at the Coming Study Group 14 Meeting In June 1994", International Telecommunications Union COM 14–10E, Mar. 1994, 10 pages.

Hawley, George T., "Systems Considerations for the Use of xDSL Technology for Data Access", IEEE Communications Magazine, Mar. 1997, pp. 56–60.

Forney, G. David, "The V.34 High–Speed Modem Standard", IEEE Communications Magazine, Dec. 1996, pp. 28–33.

Stuart, R.L., International Telecommunications Union, Temporary Document 57–E, "Clean Final Draft of Recommendation V.34", Geneva, 1–9 Jun. 1994, pp. 1–70.

*Primary Examiner*—Douglas W. Olms
*Assistant Examiner*—Kenneth Vanderpuye
*Attorney, Agent, or Firm*—Wilson Sonsini Goodrich & Rosati

[57] ABSTRACT

The present invention allows a modem to operate in both the voice band, from 300 to 3400 Hz, and also in the ADSL band, which extends above 3400 Hz. Unlike conventional ADSL modems, the present invention avoids the computationally-intensive operations required to extract all the available band of a telephone subscriber loop. Consequently, the present invention can be implemented with low-cost modifications to existing voice band modems. The present invention thereby offers higher data transfer rates at a fraction of the cost of more complicated ADSL modems. The present invention also provides bypassing functions, which allow communications through a modem located at the telephone central office side of a subscriber loop to be switched through a packet-switched network, which is capable of accommodating high data transfer rates, instead of a central office switching system, which generally imposes unnecessary limitations on data transfer rates.

61 Claims, 14 Drawing Sheets

DUAL BAND MODEM FOR HIGH BANDWIDTH COMMUNICATIONS

RELATED APPLICATIONS

This application is a continuation-in-part of a pending U.S. patent application, entitled "Dual Band Modem," by inventors Donald M. Bellenger and Steven P. Russell, having Ser. No. 08/855,052 and a filing date of May 13, 1997 (Attorney Docket No. 15886-899). This application hereby incorporates by reference the above-referenced patent application.

This application additionally incorporates by reference a related non-provisional application, entitled "Dual Band Bypass Modem," by inventors, Donald M. Bellenger and Steven P. Russell, having serial number TO BE DETERMINED, and filing date TO BE DETERMINED, which was filed on the same day as the instant application (Attorney Docket No. 15886-120).

BACKGROUND

1. Field of the Invention

The present invention relates to systems for connecting remote computer systems to computer networks through telephone lines, and more particularly to a modem which operates at a voice band frequency below 4000 Hz as well as a higher broad band frequency above 4000 Hz.

2. Related Art

With the advent of computer networking and personal computers, public switched telephone networks (PSTNs) are increasingly used to connect computer systems to other computer systems, and to connect computer systems to computer networks, such as the Internet. As computer systems begin to support data-intensive applications, which transfer sounds, images and video between computer systems, the connections between computer systems are subject to increasing demands for larger amounts of bandwidth. Although the subscriber loops, which connect telephones to central office switching systems, are capable of accommodating transfers of data between computer systems, the available bandwidth of data transfers through PSTNs is severely constrained by inherent limitations of the switching equipment located in central office switching systems. Most of this switching equipment digitizes analog signals on subscriber loops by sampling the analog signals at a frequency of 8 kHz. Because of the Nyquist limit, this sampling rate imposes an artificial maximum frequency of 4 kHz on signals that can be passed from a subscriber loop through a PSTN.

Fortunately, the majority of capital investment in the telephone system is in the subscriber loops, which are pairs of wires running to homes and business from telephone central office switching systems. With new asymmetric digital subscriber loop (ADSL) modems, a typical subscriber loop can send 8,000,000 bits per second. The main difference between ADSL modems and older V.34 type modems is that in ADSL a distant modem is located in a telephone central office, and it receives a signal across a subscriber loop before the bandwidth is artificially reduced by equipment in the central office switching system. (In the following disclosure, the term "ADSL" is used as a generic description of all modems operating over direct telephone wire at frequencies above 4,000 Hz. The actual method used to modulate the line at the high band rate may or may not actually be asymmetric.)

ADSL technology was largely started by Dr. Joseph W. Lechleider at Bell Communications Research (Bellcore) during the mid-1980's, and has culminated in American National Standards Institute (ANSI) standard T1.413. The same standard has been adopted by the European Telecommunications Standard Institute (ETSI). The T1.413 standard is based upon discrete multi-tone (DMT) modulation. There are other related techniques, which are not standardized, such as Carrierless Amplitude modulation/Phase modulation (CAP), and another older method known as Quadrature Amplitude Modulation (QAM). The three above-mentioned methods can be grouped together has efficient line codes. This means that they are capable of approaching the Shannon-Hartley limit for the maximum amount of information which can be sent through a given channel. In addition to these three methods, there are many older modulation techniques such as AMI (Alternate Mark Inversion) and 2B1Q, which operate at levels below the maximum possible rate. All of these codes can be used to send high speed data over ordinary telephone lines.

While the theoretical capabilities for ADSL technology are quite promising, there exist large numbers of barriers to making the required changes to implement ADSL technology on a wide scale. First, the technology required to implement ADSL modems is considerably more expensive than for existing V.34 modems. For example, an ADSL modem at this time costs about $2,000, compared to about $100 for a V.34 modem. ADSL modems can be expected to decline in price to somewhere in the range of $500 to $1,000 within the next year because of volume shipments. However, there will nevertheless exist an approximately 5 to 1 ratio in cost of ADSL over V.34 modems for the foreseeable future. Second, there is currently no infrastructure to support ADSL modems in telephone central offices. A large number of ADSL modems, all requiring 8 Mbits per second of data, will quickly overwhelm any conceivable data switch of today's technology. Because of this bandwidth bottleneck, it is unlikely that the benefits of ADSL technology will actually be realized on a broad scale any time soon. Unfortunately, the tremendous additional cost for ADSL modems must be paid even though much of the additional data rate will not be immediately useable.

Another problem with ADSL is that there is no known content which requires such bandwidth. Video on demand (VOD) could theoretically utilize the bandwidth available through ADSL technology however, VOD requires a complex and expensive system of video servers to distribute the material. This infrastructure presently does not exist. Internet access is a rapidly evolving content area which could theoretically utilize the additional bandwidth of ADSL technology, but at present, Internet applications are designed for transmission facilities comprising 33 Kbit links and T1 trunks.

What is needed is a modem which is capable of providing the increased bandwidth from ADSL technology at a fraction of the cost.

SUMMARY

The present invention allows a modem to operate in both the voice band, from 300 to 3400 Hz, has typified by V.34 and 56K modems, and also in the ADSL band, which extends above 3400 Hz. A modem according to the present invention communicates with a modem on the other end of a telephone line to determine if the other modem is capable of operating in the ADSL band. If so, and if the telephone line is capable of carrying signals in the ADSL band, the modems communicate at a higher data rate in the ADSL band. Otherwise, by default the modems communicate at a lower data rate in the voice band.

The present invention has a number of advantages. First, a modem user only has to buy one modem, which can operate at both a lower data rate in the voice band, and a higher data rate in the ADSL band if possible. Second, the present invention can be implemented with relatively simple modifications to existing voice band modem designs. Consequently, the present invention can be produced much more cheaply than ADSL modems. One observation which underlines the design of the present invention is the fact that voice band modems, such as V.34 modems, spend a large amount of their digital signal processing (DSP) power on computations required to extract the maximum amount of bandwidth out of the limited 300–3400 Hz voice band. If instead, this DSP capability is used only to modulate data to the central voice switch end of the subscriber loop, then the potential bandwidth of the DSP is much higher. The present invention allows ordinary V.34/56K modems with minor modifications to operate at over 100,000 bits per second on ordinary carrier serving area (CSA) subscriber telephone loops. On shorter telephone loops, such as those found in private branch exchanges, hotels, offices and in large organizations, a modified V.34 modem is capable of transmitting and receiving over one million bits per second.

The single most significant factor which determines the data transfer rate of a V.34 modem is the bandwidth limitation imposed by the communication channel. Like all previous modem standards, and the new ADSL modem standard, V.34 uses quadrature amplitude modulation (QAM), in which two components of a 2-dimensional symbol are amplitude modulated on in-phase and quadrature sinusoidal carriers at a common carrier frequency.

The symbol rate is a key metric of any modem. It directly translates into the bandwidth of the carrier channel. The number of bits per symbol varies as a function of the signal-to-noise ratio of the channel. Increasing the symbol rate is a simple process of speeding up the over all clock. Increasing the number of bits per symbol is much more complex and the expense grows as the Shannon-Hartley limit is approached.

For any fixed channel, the bandwidth and signal-to-noise ratio are constant. In such a fixed channel, progressively more cost per bit is required for each additional bit of bandwidth extracted from the channel. In the example of the V.34 modem, the first 15,000 bits per second are cheaper to recover than additional bits between 15,000 and 30,000 bits per second. In the case of ADSL modems, the first one million bits per second are much cheaper to recover than additional bits per second beyond one million bits per second. One of the objectives of the present invention is to use a voice band modem's ability to squeeze expensive bits out of a narrow channel to instead take the least expensive bits out of the much wider ADSL channel.

There are several mechanisms used by a V.34 modem which require large DSP resources for relatively small increases in bandwidth. First, is the use of a large number of bits per symbol with constellations of 1664 points. Second, is the use of Trellis coding with Viterbi decoders to obtain a signal-to-noise gain of 4.2 dB. Third, is the use of constellation shaping to gain another one dB of signal-to-noise. Further capacity is used for decision-feedback equalization and precoding to use all of the available spectrum. These techniques consume a great amount of computational power, but produce very little extra bandwidth. The biggest gain in V.34 over the previous V.32 standard was simply to increase the symbol rate.

The present invention operates by avoiding the edges of the channel in signal-to-noise ratio and spectrum, and concentrating all computational resources on maximizing symbol rate. For example, in one embodiment, the modulation method is V.22bis QAM 16 at 100,000 symbols per second. This approach is inefficient in the sense that some of the capacity of the channel is lost. However, since there is more channel capacity than can be immediately used, it is better to recover the cheapest bits first, and ignore the more expensive bits at the edges of the channel which cannot be used anyway.

In order to describe operation of the present invention, we refer to the term "effective symbol rate period." For modems which use a single orthogonal channel on a single physical channel, the effective symbol rate is the actual symbol rate. For multi-channel modems such as DMT, which transmit data over a plurality of orthogonal channels on a single physical channel, the effective symbol rate is the actual symbol rate multiplied by the number of orthogonal channels.

Thus, the present invention can be characterized as an apparatus for transmitting data over a telephone line, comprising: a telephone line interface coupled to the telephone line; a communication circuit coupled to the telephone line interface, the communication circuit including circuitry to communicate at both an effective symbol rate below 4,000 symbols per second, and an effective rate above 4,000 symbols per second, through the telephone line interface; a negotiation mechanism coupled to the telephone line interface, including a mechanism to negotiate with a remote modem coupled to the telephone line to determine whether to communicate with the remote modem at a symbol rate above 4,000 symbols per second; a transfer rate switching mechanism coupled to the communications circuit and the negotiation mechanism, including a mechanism to switch the communication circuit between an effective symbol rate below 4,000 symbols per second and an effective symbol rate above 4,000 symbols per second; and a mechanism that converts between analog circuit-based data on telephone lines in the plurality of telephone lines and digital packet-based data on the packet-switched network.

According to one aspect of the present invention, the present invention switches between an effective symbol rate below 8,000 symbols per second and an effective symbol rate above 8,000 symbols per second.

According to one aspect of the present invention, the present invention switches between a rate below 64,000 bits per second and a rate above 64,000 bits per second.

According to one aspect of the present invention, the present invention does not include circuitry to communicate using an Integrated Services Digital Network (ISDN) protocol.

According to another aspect of the present invention, the communication circuit includes circuitry to communicate using an ISDN protocol and a V.34/56K protocol.

According to one aspect of the present invention, the communications circuit is used to communicate facsimile signals with the remote modem.

According to another aspect of the present invention, the apparatus includes a line probing mechanism coupled to the telephone line interface, which includes resources to determine if the telephone line is capable of passing information at an effective symbol rate above 4,000 symbols per second.

According to another aspect of the present invention, the apparatus includes a mechanism coupled to the telephone line interface that exchanges information with the remote modem to identify a continuation of a previous communication system with the remote modem. This mechanism includes: a mechanism that exchanges parameters of an old communication session at the end of the old communication session; a mechanism that starts a new communication session by exchanging the old parameters, so that if the old parameters match, the new communication sessions starts with the old parameters, and if the old parameters mismatch the connection between the first modem and the second modem is retrained to produce new parameters for the new communication session.

The present invention can also be characterized as a method for transmitting data across a telephone line between the first modem and the second modem, the telephone line being coupled to the first modem and the second modem. The method comprises the steps of: establishing a connection between the first modem and the second modem through the telephone line; negotiating between the first modem and the second modem to establish an agreed-upon communication rate. If the agreed-upon communication rate is below 4,000 effective symbols per second, communicating between the first modem and the second modem across the telephone line at a rate below 4,000 effective symbols per second. If the agreed-upon communication rate is above 4,000 effective symbols per second, communicating between the first and the second modems across the telephone line at a rate above 4,000 effective symbols per second.

The present invention can also be characterized as a method for transferring data across telephone subscriber loops. The method operates in a system including, a first subscriber loop, a second subscriber loop, a first modem coupled to the first subscriber loop and a packet-switched network, and a second modem coupled to the second subscriber loop and the packet-switched network. The method comprises the steps of: establishing a connection from the first subscriber loop to the packet-switched network through the first modem; establishing a connection between the first modem and the second modem through the packet-switched network; establishing a connection between the packet-switched network and the second subscriber loop through the second modem; and transferring data between the first subscriber loop and the second subscriber loop through the first modem, the packet-switched network and the second modem.

The present invention can also be characterized as an apparatus for transferring information across subscriber loops and a packet-switched network, comprising a first modem coupled to a first subscriber loop and the packet-switched network; a second modem coupled to a subscriber and packet-switched network; and a routing mechanism for establishing a connection through the packet-switched network between the first modem and the second modem.

The present invention can also be characterized as a method for bypassing a telephone switching system. The method operates in a system including: a first subscriber loop; a first modem coupled to the first subscriber loop and a packet-switched network; a switch coupled to the first subscriber loop, the telephone switching system and the first modem; a second modem coupled to a second subscriber loop and the packet-switched. The method operates by: establishing a connection between the first subscriber loop and the switch; receiving a control signal to switch the first subscriber loop to the packet-switched network; switching the first subscriber loop in response to the control signal to the packet-switched network through the first modem; establishing a connection from the first subscriber loop to the packet-switched network through the switch and the first modem; establishing a connection between the first modem and the second modem through the packet-switched network; establishing a connection between the packet-switched network and the second subscriber loop through the second modem; and transferring data between the first subscriber loop and the second subscriber loop through the first modem, the packet-switched network and the second modem.

The present invention can also be characterized as an apparatus for bypassing a central office switching system, comprising: a first modem coupled to a packet-switched network; a switch coupled to a first subscriber loop, the central office switching system and the first modem, for switching the first subscriber loop between the telephone switching system and the packet-switched network through the first modem; a second modem coupled to a second subscriber loop and the packet-switched network; and a routing mechanism for establishing a connection through the packet-switched network between the first modem and the second modem.

The present invention can also be characterized as a method for bypassing a telephone switching system. The method operates in a system including: a first modem; a first subscriber loop coupled to the first modem; a second modem coupled to the first subscriber loop and the packet-switched network; a third modem coupled to a second subscriber loop and a packet-switched network; a fourth modem coupled to the second subscriber loop. The method operates by: establishing a connection between the first modem and the second modem through the first subscriber loop; exchanging information between the first modem and the second modem through the first subscriber loop to establish an agreed-upon communication rate; if the agreed-upon communication rate is below 4,000 effective symbols per second, communicating between the first and second modem across the first subscriber loop at a rate below 4,000 effective symbols per second; if the agreed-upon communication rate is above 4,000 effective symbols per second, communicating between the first and second modem across the first subscriber loop at a rate above 4,000 effective symbols per second; establishing a connection from the second modem across the packet-switched network to the third modem; establishing a connection from the third modem to the fourth modem through the second subscriber loop; exchanging information between the third modem and the fourth modem through the second subscriber loop to establish an agreed-upon communication rate; if the agreed-upon communication rate is below 4,000 effective symbols per second, communicating between the third and fourth modem across the second subscriber loop at a rate below 4,000 effective symbols per second; and if the agreed-upon communication rate is above 4,000 effective symbols per second, communicating between the third and fourth modem across the second subscriber loop at a rate above 4,000 effective symbols per second.

The present invention can also be characterized as an apparatus for switching signals on subscriber loops between a central office switching system and a packet-switched network, comprising: a first port coupled to a subscriber loop; a second port coupled to the central office switching system; a third port coupled to the packet-switched network; and a switch coupled to the first port, the second port, the third port, the switch responding to a control signal to switch the first port between the second port and the third port, wherein the switch facilitates communication of facsimile signals between the first port and the second port.

DESCRIPTION

The following description is presented to enable any person skilled in the art to make and use the invention, and is provided in the context of a particular application and its requirements. Various modifications to the preferred embodiment will be readily apparent to those skilled in the art, and the general principles defined herein maybe applied to other embodiments and applications without departing from the spirit and the scope of the invention. Thus, the present invention is not intended to be limited to the embodiment shown, but is to be afforded the widest scope consistent with the principles and features disclosed herein.

Figure 1:
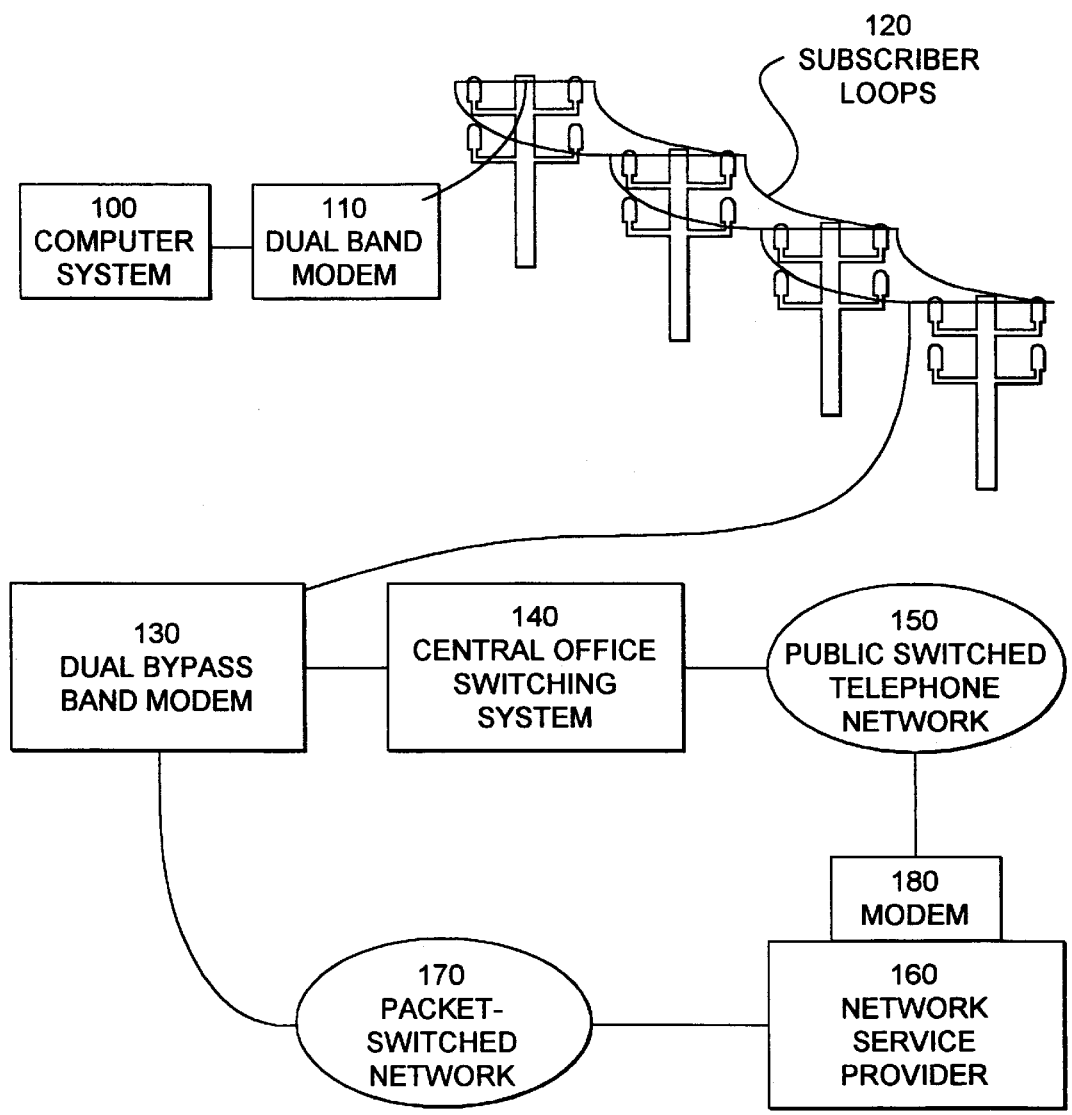
FIG. 1 is a block diagram illustrating how dual band bypass modem 130 of the present invention connects subscriber loops 120 to central office switching system 140 and packet-switched network 170 in accordance with an aspect of the present invention.

FIG. 1 illustrates how subscriber loops 120 connect through dual band bypass modem 130 to central office switching system 140 and packet-switched network 170 in accordance with an aspect of the present invention. FIG. 1 includes computer system 100, which is any type of computer system capable of receiving and transferring data. This includes computer systems as diverse as personal computers, main frame computers, and embedded system controllers.

Computer system 100 connects to dual band modem 110. In one embodiment, dual band modem 110 is built into computer system 100. In another embodiment, dual band modem 110 exists independently from computer system 100.

Dual band bypass modem 130 connects to central office switching system 140. Central office switching system 140 is a centralized telephone switching system, which connects to a plurality of subscriber loops that extend from central office switching system 140 to telephone line users. This includes private automatic b ranch exchanges (PABXs), as well as switching systems found within telephone companies.

Dual band modem 110 connects to subscriber loops 120, which carry electrical signals between dual band modem 110 and central office switching system 140 through dual band bypass modem 130. If central office switching system 140 is a PABX system, such as those found within businesses and hotels, subscriber loops 120 may consist entirely of wiring within a building. If central office switching system 140 is located at a telephone company, subscriber loops 120 extend from remote subscriber equipment to a telephone company switching system. Subscriber loops 120 connect to dual band bypass modem 130, which switches subscriber loops 120 between central office switching system 140 and packet-switched network 170.

Central office switching system 140 also connects to public switched telephone network 150, which routes and carries telephone signals between a plurality of different central office switching systems.

Public switched telephone network 150 connects to network service provider 160 through modem 180. Network service provider 160 is any type of system providing network access to computer systems. This includes commercial on-line services such as America On-Line and CompuServe.

Dual band bypass modem 130 also connects to packet-switched network 170. Packet-switched network 170 is any type of network which transfers digital data; it is not limited to networks using a packet-switched protocol. In one embodiment, packet-switched network 170 is the Internet. However, any other networks for transferring digital data may be used.

Packet-switched network 170 connects to network service provider 160, which provides facilities for connecting computer systems to packet-switched network 170, as well as other services used in conjunction with packet-switched network 170.

The system embodied in FIG. 1 operates in the following manner. Dual band bypass modem 130 is usually transparent. For telephone users making or receiving ordinary voice calls, the system operates as if the dual band bypass modem 130 was not present. When a data call is initiated, dual band bypass modem 130 springs into action. In one embodiment, a call is first placed through central office switching system 140 and public switched telephone network 150 to network service provider 160 through modem 180. Upon receipt of identification information from computer system 100, network service provider 160 sends a data packet via packet-switched network 170 to activate dual band bypass modem 130. Dual band bypass modem 130 has an Internet protocol address, and network service provider 160 sends commands directly to this Internet protocol address through packet-switched network 170. Upon receipt of an activation command through packet-switched network 170, dual band bypass modem 130 disconnects the subscriber loop from central office switching system 140 and establishes an alternate connection to network service provider 160 through packet-switched network 170.

In the active state, dual band bypass modem 130 supplies all of the POTS functions normally provided from central office switching system 140 to subscriber loops 120. This includes battery feed, overvoltage, ringing injection, supervision, codec, hybrid and testing functions. During the bypass period, any incoming calls from central office switching system 140 to the subscriber loop receives either a ring-no-answer signal, or alternatively a busy signal.

According to another embodiment of the present invention, the control signal used to switch dual band bypass modem 130 is activated by an electrical signal on the subscriber loop. In one embodiment, this control signal is encoded in the loop current status of the subscriber loop, and more specifically in the on/off hook status of the subscriber loop. In another embodiment, the control signal is encoded on a dual tone multiple frequency (DTMF) or pulse signal on a subscriber loop. Alternatively, any other ground start, loop start, or electromagnetic signaling method may be used. For example, in one embodiment the signal is encoded on autobaud modem signals as defined by CCITT Blue Book Series V or by CCITT V.34. In another embodiment, the signal is encoded on modem carrier tones, such as defined by ANSI T1.413. These include the 34.5 kHz initialization tone; the 69 kHz upstream pilot tone and the 276 kHz downstream pilot tone. In another embodiment, the signal on the subscriber loop takes the form of a digital message encoded on the subscriber loop.

According to another embodiment of the present invention, the control signal is activated by a signal which travels through central office switching system 140. This signal may originate from network service provider 160, or alternatively, it may originate from a portion of the telephone system, possibly public switched telephone network 150, or central office switching system 140.

In another embodiment, the control signal is activated by a signal from packet-switched network 170. In one embodiment this signal originates from network service provider 160. In another embodiment this signal originates from the telephone system. Alternatively, this signal may originate from any other source connected to packet-switched network 170.

In one embodiment the control signal for the switch is activated by a single hook switch flash (HSF). This embodiment operates as follows. The switch normally connects the subscriber loop to the voice network. In placing a voice call, the system operates as if the switch were not present. To activate the switch, the subscriber takes the line off hook, and then performs a short interruption of the loop current. Hook switch flash is defined as the following sequence: off hook, on hook, off hook. When the HSF is performed manually by a human, the initial off hook and on hook may vary in duration approximately between the limits of 40 msec minimum, to a maximum of 3 seconds. In another embodiment, which detects HSF signals from a computer, intervals of less than 30 msec are used. Another embodiment uses more than a single HSF to trigger a switching operation.

It is assumed that there are two types of subscriber loops; voice band and broad band. For the voice band subscriber loops, any interruption in the subscriber loop current causes the switch to return the subscriber loop to the voice network. For broad band subscriber loops, the switch ignores disconnect loop current status. Other embodiments use further disconnect methods, including internal timers, a ringing signal from the voice network, and other explicit disconnect signals sent through the subscriber loop and the data network.

In another embodiment, the switch is activated by control codes dialed into a subscriber loop. For example, when a subscriber dials an ordinary telephone call to network service provider 160, network service provider 160 activates dual band bypass modem 130 by sending explicit commands to dual band bypass modem 130.

In another embodiment, dual band bypass modem 130 decodes the dialing signal on a subscriber loop and compares the number dialed with an internal table of numbers. If a match is found between the number dialed and a number stored in the table, the subscriber loop is switched from the voice to the data network. This number may be dialed in the form of a DTMF or pulse dialing signal. Dual band bypass modem 130 monitors the off hook status of a subscriber loop. When the subscriber loop goes off hook, dual band bypass modem 130 monitors what number is dialed into the subscriber loop and looks this number up in the table.

Figure 2:
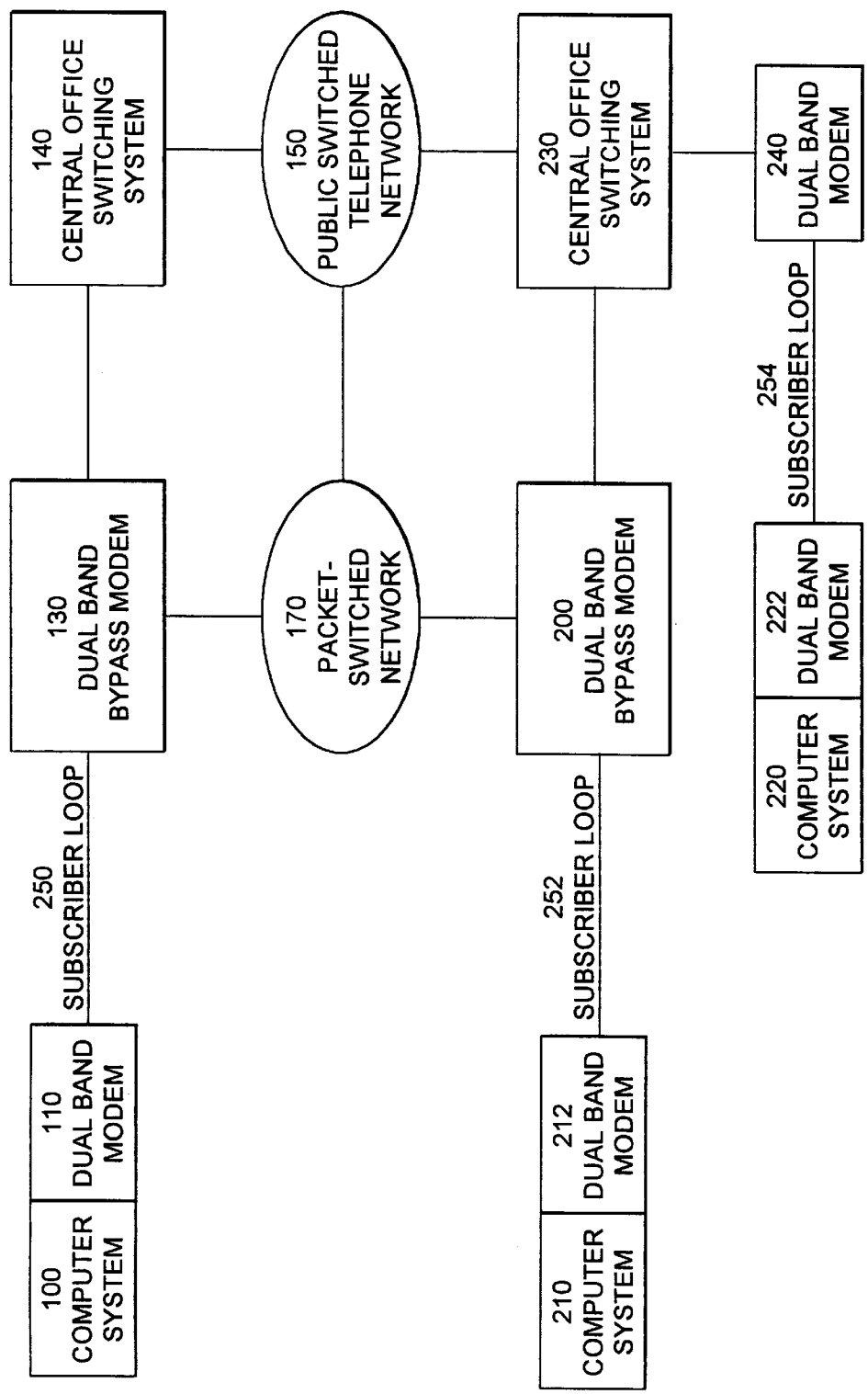
FIG. 2 is a block diagram illustrating how dual band bypass modem 130 and dual band bypass modem 200 are used to bypass public switched telephone network 150 in communications between subscriber loop 250 and subscriber loop 252 in accordance with an aspect of the present invention.

FIG. 2 is a block diagram illustrating how dual band bypass modem 130 is used to route information between subscriber loops 250, 252 and 254 through packet-switched network 170 in accordance with an aspect of the present invention. Computer system 100 includes dual band modem 110, which connects through subscriber loop 250 to dual band bypass modem 130, which connects subscriber loop 250 to either central office switching system 140 or packet-switched network 170. Central office switching system 140 connects to public switched telephone network 150, which connects to central office switching system 230. Dual band bypass modem 200 connects to packet-switched network 170, subscriber loop 252 and central office switching system 230. Dual band bypass modem 200 selectively switches subscriber loop 252 between either packet-switched network 170 or central office switching system 230. Subscriber loop 252 connects to computer system 210 through dual band modem 212. Central office switching system 230 additionally connects to dual band modem 240, which connects to subscriber loop 254. Subscriber loop 254 connects to computer system 220 through dual band modem 222.

A number of connections are possible between computer systems 100, 210 and 220 through either packet-switched network 170 or public switched telephone network 150 in FIG. 2. Computer system 100 can communicate through dual band modem 110 and subscriber loop 250 to dual band bypass modem 130. If dual band bypass modem 130 is switched so that it connects subscriber loop 250 to central office switching system 140, a pathway can be established from central office switching system 140 through public switch telephone 150 to central office switching 230. From central office switching 230, a pathway is established through dual band bypass modem 200 on to subscriber loop 252, and ultimately into dual band modem 212 within computer system 210.

Alternatively, if dual band bypass modem 130 is switched so that it connects subscriber loop 250 to packet-switched network 170, a pathway can be established through packet-switched network 170 to dual band bypass modem 200.

From dual band bypass modem 200, a connection can then be established through subscriber loop 252 to dual band modem 212 within computer system 210.

Computer system 100 communicates with computer system 220 by establishing a connection through dual band bypass modem 130, central office switching system 140, public switched telephone network 150, central office switching system 230, dual band modem 240 and dual band modem 222. This connection passes through the public switched telephone network 150 and is consequently not capable of an accelerated transfer rate.

Figure 3:
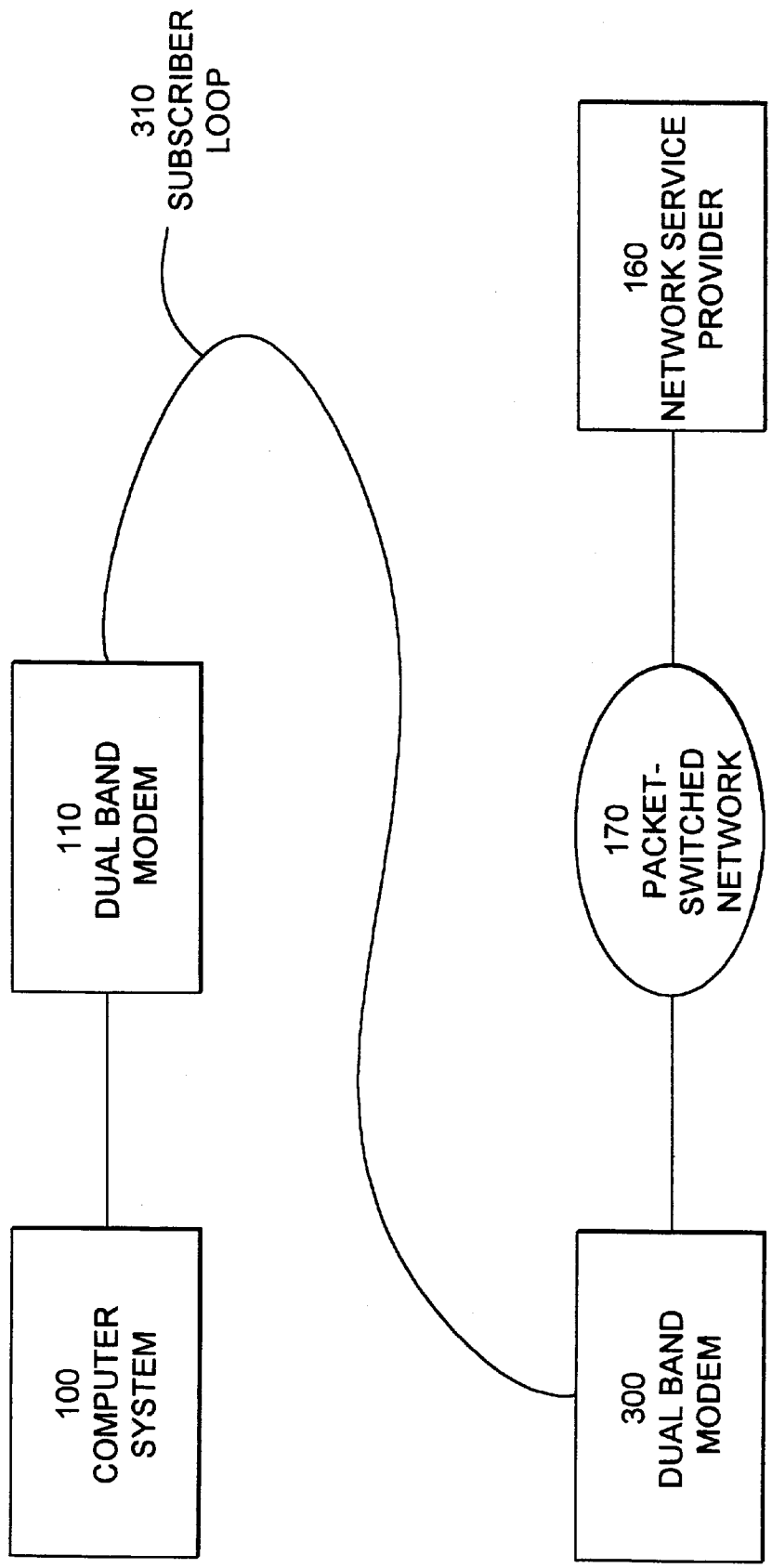
FIG. 3 is a block diagram illustrating how dual band modems 300 and 110 are used to connect computer system 100 to packet-switched network 170 in accordance with an aspect of the present invention.

FIG. 3 is a block diagram illustrating how dual band modems 110 and 300 can be used to connect computer system 100 to packet-switched network 170, and ultimately to network service provider 160 in accordance with an aspect of the present invention. Computer system 100 connects to dual band modem 110 through which it communicates over subscriber loop 310 with dual band modem 300. Dual band modem 300 itself connects to packet-switched network 170, which further connects to network service provider 160. In operation, dual band modem 110 negotiates with dual band modem 300 to determine if they are both capable of communicating at an accelerated rate. If so, communications between computer system 100 and network service provider 160 proceed at the accelerated rate. If not, or if subscriber loop 310 is not capable of accommodating ADSL band transmissions, dual band modem 110 and dual band modem 300 communicate at a lower voice band rate.

Figure 4:
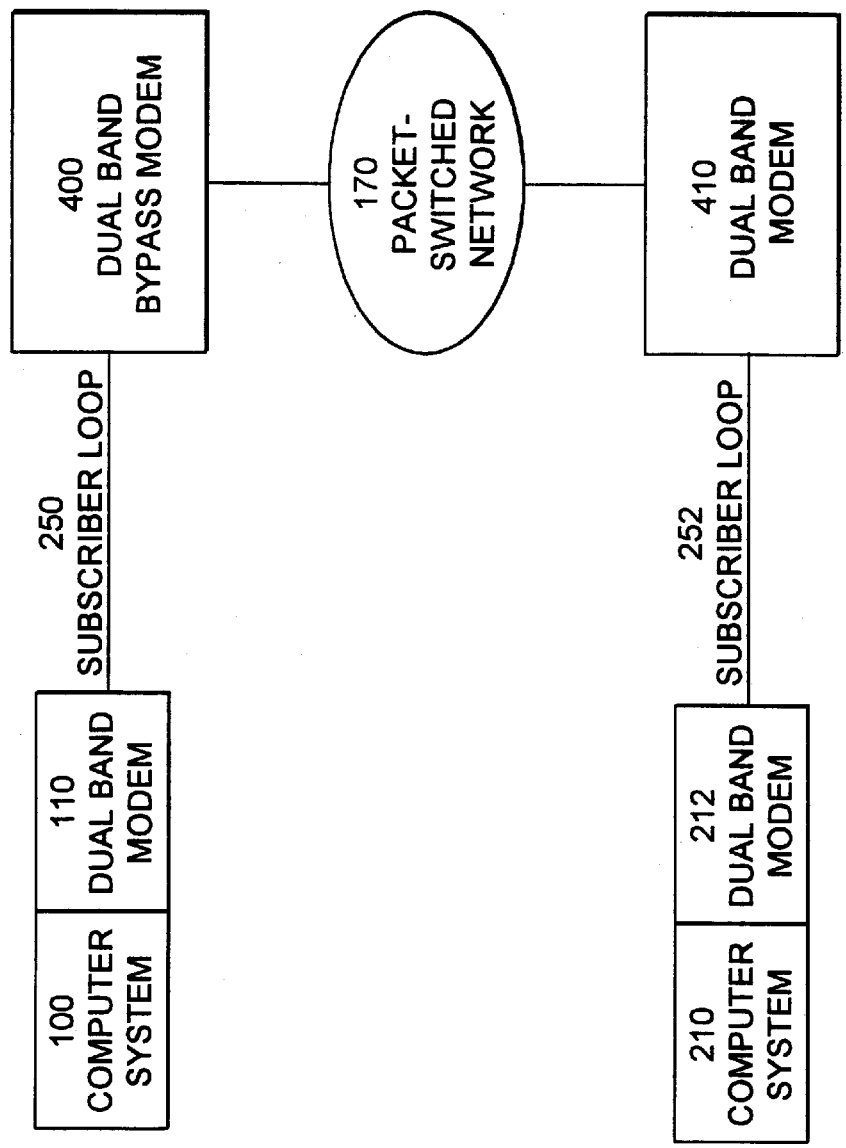
FIG. 4 is a block diagram illustrating how dual band modem 400 and dual band modem 410 are used to route communications between subscriber loop 250 and subscriber loop 252 across packet-switched 170 in accordance with an aspect of the present invention.

FIG. 4 illustrates a method of connecting computer system 100 to computer system 210 through packet-switched network 170 in accordance with an aspect of the present invention. Note that FIG. 4 is the same as FIG. 2 except that dual band bypass modem 130 has been replaced with dual band modem 400 and dual band bypass modem 200 has been replaced with dual band modem 410. Also central office switching system 140, public switched telephone network 150, central office switching system 230, dual band modem 240, subscriber loop 254 and computer system 220 have been removed. This reflects the fact that the system illustrated in FIG. 4 operates completely independently of central office switching systems and the public switched telephone network 150. The system pictured in FIG. 4, does however, use telephone subscriber loops 250 and 252.

The system illustrated in FIG. 4 operates in the same way as the system illustrated in FIG. 2, except that only one connection is possible. Computer system 100 connects to computer system 210 through packet-switched network 170. If subscriber loop 250 is capable of ADSL band transmissions, dual band modem 110 communicates with dual band modem 400 at an accelerated rate. If subscriber loop 252 is capable of accommodating ADSL band transmissions, dual band modem 212 communicates with dual band modem 410 at an accelerated rate.

Figure 5:
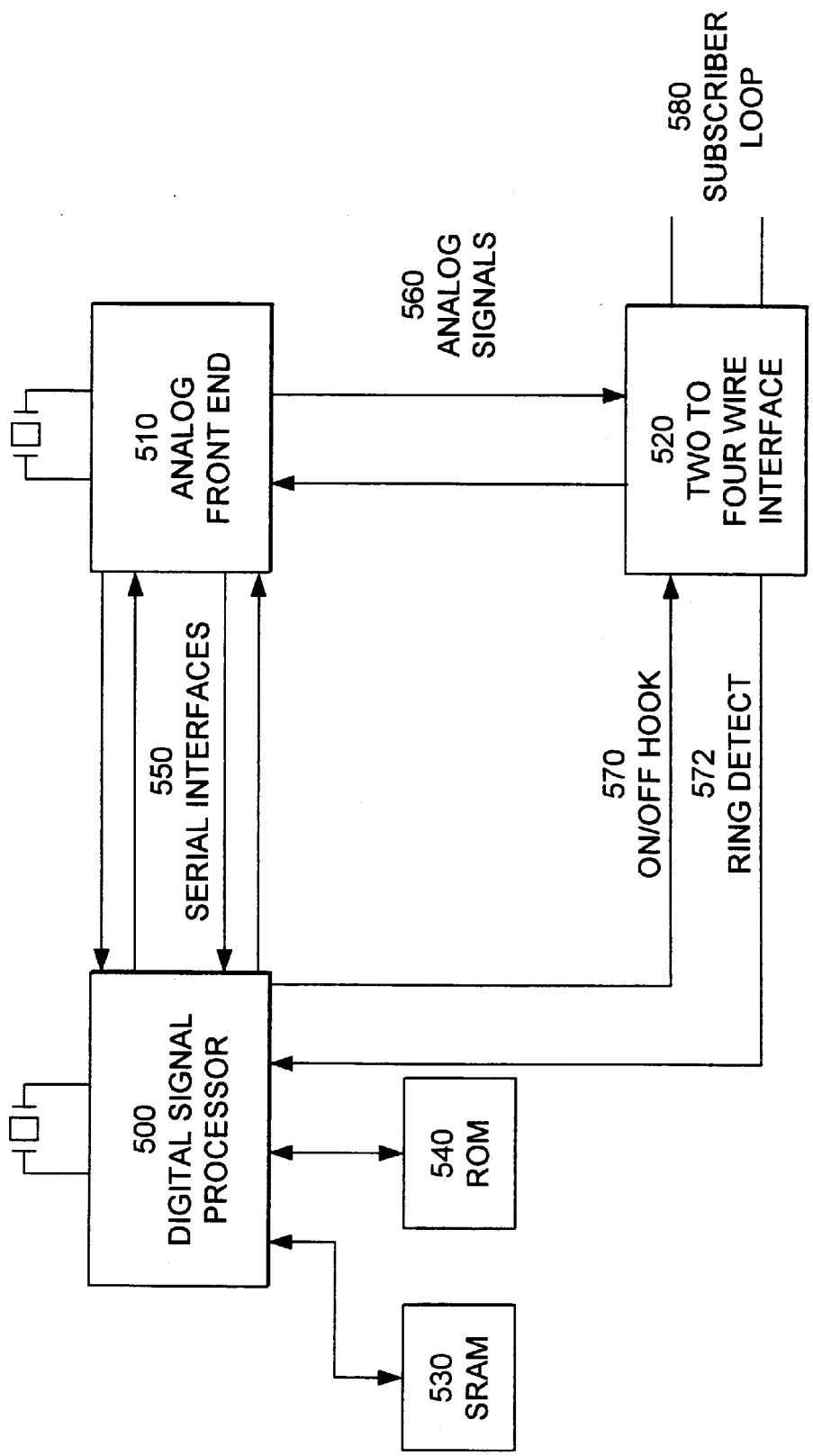
FIG. 5 is a block diagram of some of the major functional components of a dual band modem in accordance with an aspect of the present invention.

FIG. 5 is a block diagram illustrating some of the major functional components of a subscriber side dual band modem in accordance with an aspect of the present invention. The modem illustrated in FIG. 5 includes digital signal processor 500, which is coupled to SRAM 530 and ROM 540.

Digital signal processor 500 additionally connects through serial interfaces 550 to analog front end 510. Analog front end 510 connects through analog signals 560 to two-to-four wire interface 520. Two-to-four wire interface 520 connects to digital signal processor 500 through on/off hook signal 570 which originates in digital signal processor 500. Two-to-four wire interface 520 also connects to digital signal processor 500 through ring-detect signal 572. Two-to-four wire interface 520 additionally connects to subscriber loop 580.

Signals from subscriber loop 580 pass through two-to-four wire interface 520 where they are converted from two wire analog signals to four wire analog signals. These analog signals 560 connect to analog front end 510, which digitizes analog signals 560 and transmits them through serial interfaces 550 to digital signal processor 500. Digital signal processor 500 performs the algorithms to extract data encoded within the signals on subscriber loop 580.

The design of a dual band modem according to the present invention is essentially the same as the design of the existing V.34/56K modems. Only slight modifications are required to modify existing V.34/56K type modems to operate as dual band modems. The codec (analog to digital converters) and filters must be modified to pass the higher data rate. Exactly what type of codec is required depends on the target number of bits per second that is desired. For multi-megabit speeds a codec with about 14 bits per sample and 10,000,000 samples per second will work. However, a preferred embodiment operates in the range of 400,000 bits per second. This speed is approximately 10 times the speed of the present 33/56K standard, and is consistent with the rest of the Internet infrastructure.

The second change to enable a V.34 modem to operate as a dual band modem is to extend the V.34 modem protocol to allow the modem to determine whether it is connected to another modem capable of higher bandwidth transmissions. The signal may be exchanged by means of any electrical signal exchanged between the two modems. In one embodiment, following the V.34 strategy, this information is sent in a modified V.8/bis exchange. In this embodiment, the V.8 protocol is modified so that a pseudo-random noise signal, operating underneath the 2100 Hz ANSam tone, identifies the capability of the modem to operate at an accelerated rate. This psuedo-random signal is invisible to standard V.8 modems. Many other methods of signaling accelerated capability may be used.

In the case of a FAX modem, communication rates are negotiated using the T.30 protocol. In one embodiment, the T.30 protocol is modified in the same way, by adding a psuedo-random background signal to indicate dual band capability. This signal is invisible to non-dual band FAX modems.

Once the two modems understand that they are both capable of faster data rates, the V.34 standard is modified for channel probing and rate negotiation appropriate to direct wire connections. Many well known methods are available to accomplish this, such as those specified by ANSI standard T1.413.

In one embodiment the remote subscriber dual band modem includes a Texas Instruments TMS320C51 digital signal processor and a modified SGS-Thompson STLC7545 modem analog front-end. In order to transmit and receive at a higher frequency, filter transfer functions are shifted from the present cut-off frequency of 3800 Hz to a higher value, such as 100 kHz. The clock sampling frequency chain must be adjusted for the higher signal rate.

Figure 6A:
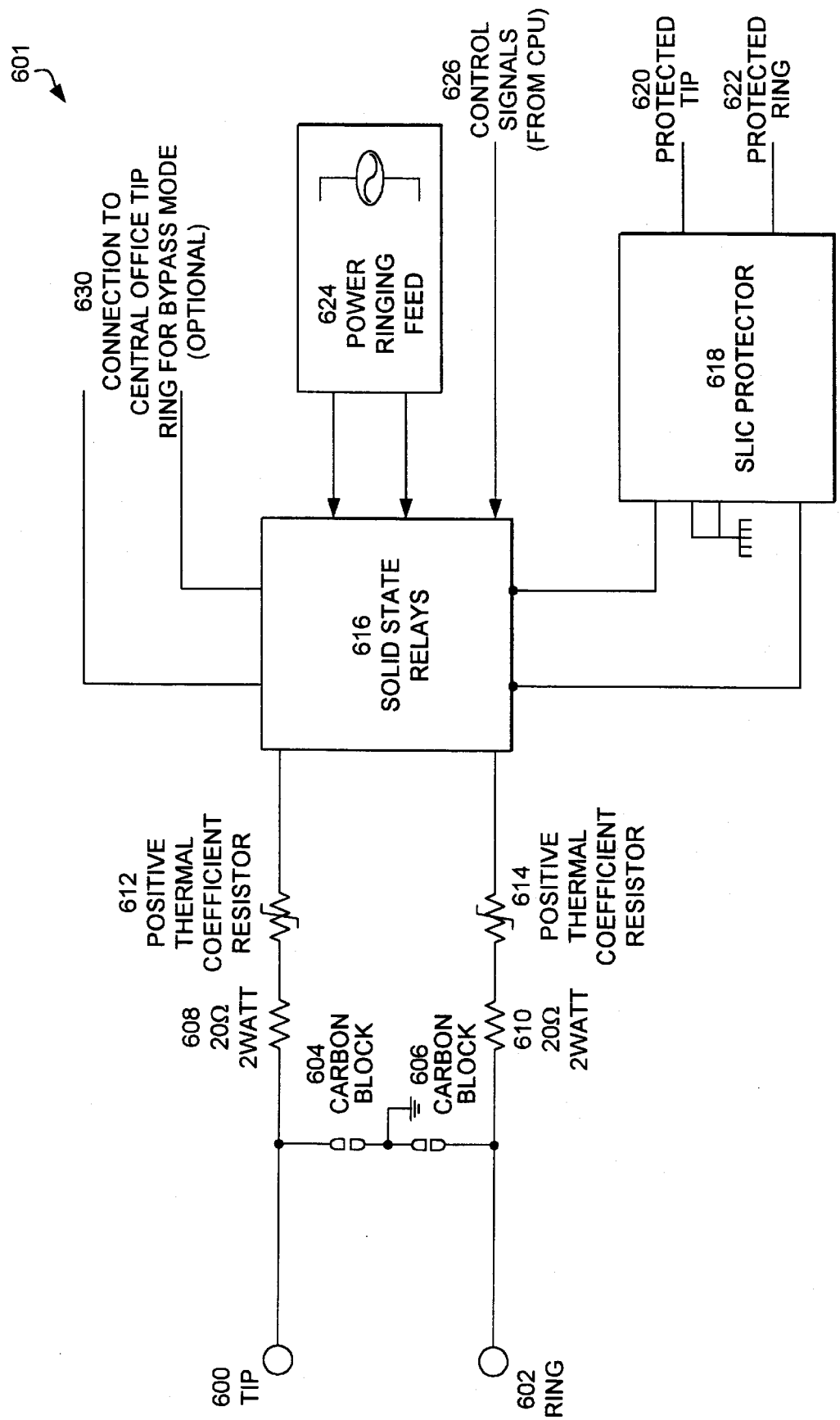
FIGS. 6A and 6B are schematic diagrams of a line card for a dual band bypass modem on the central office side of a subscriber loop in accordance with an aspect of the present invention.
Figure 6B:
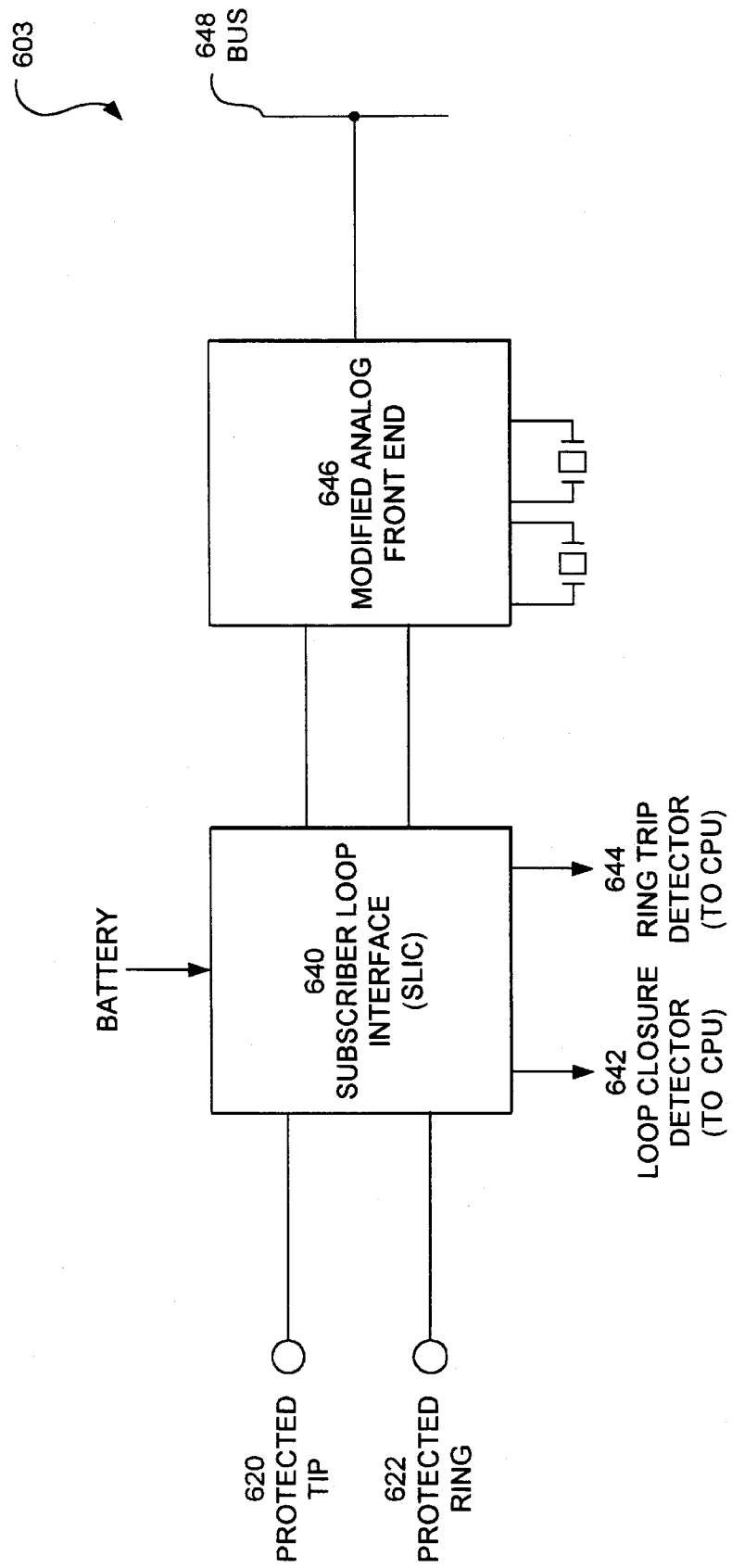

FIGS. 6A and 6B are block diagrams of communication circuits 601 and 603 illustrating the major functional components of a line card within a central site dual band bypass modem in accordance with an aspect of the present invention. In FIG. 6A, tip signal 600 feeds through 20 ohm, 2 watt resistor 608, and through positive thermal coefficient resistor 612 into solid state relays 616. Ring signal 602 feeds through 20 ohm, 2 watt resistor 610, and through positive thermal coefficient resistor 614 into solid state relays 616. Tip signal 600 additionally connects through carbon block 604 to ground. Ring signal 602 additionally connects through carbon block 606 to ground. Solid state relays 616 switch tip signal 600 and ring signal 602 between connection to central office tip ring for bypass mode 630 and SLIC protector 618. Solid state relays 616 additionally connect to power ringing feed circuitry 624. Solid state relays 616 are activated by control signals 626, which originate from CPU 718 in FIG. 7. SLIC protector 618 connects to ground and additionally connects tip signal 600 to protected tip signal 620, and connects ring signal 602 to protected ring signal 622.

In FIG. 6B, protected tip signal 620 and protected ring signal 622 feed into subscriber loop interface 640. Subscriber loop interface 640 outputs loop closure detector signal 642 and ring trip detector signal 644, which feed into CPU 718 in FIG. 7. Subscriber loop interface 640 additionally connects to modified analog front end 646, which connects to bus 648.

The circuit illustrated in FIGS. 6A and 6B operates as follows: tip signal 600 and ring signal 602 originate from a subscriber loop. These feed into solid state relays 616, which switch tip signal 600 and ring signal 602 between connection to central office tip ring for bypass mode 630, which is an optional connection to a central office switching system, and SLIC protector 618 which provides current protection for the subscriber loop interface. After passing through SLIC protector 618, tip signal 600 and ring signal 602 emerge as protected tip signal 620 and protected ring signal 622. These feed through subscriber loop interface 640 and through modified analog front end 646, which perform two-to-four wire conversion and analog to digital conversion for signals from the subscriber loop. The digitized signals ultimately feed into bus 648.

Figure 7:
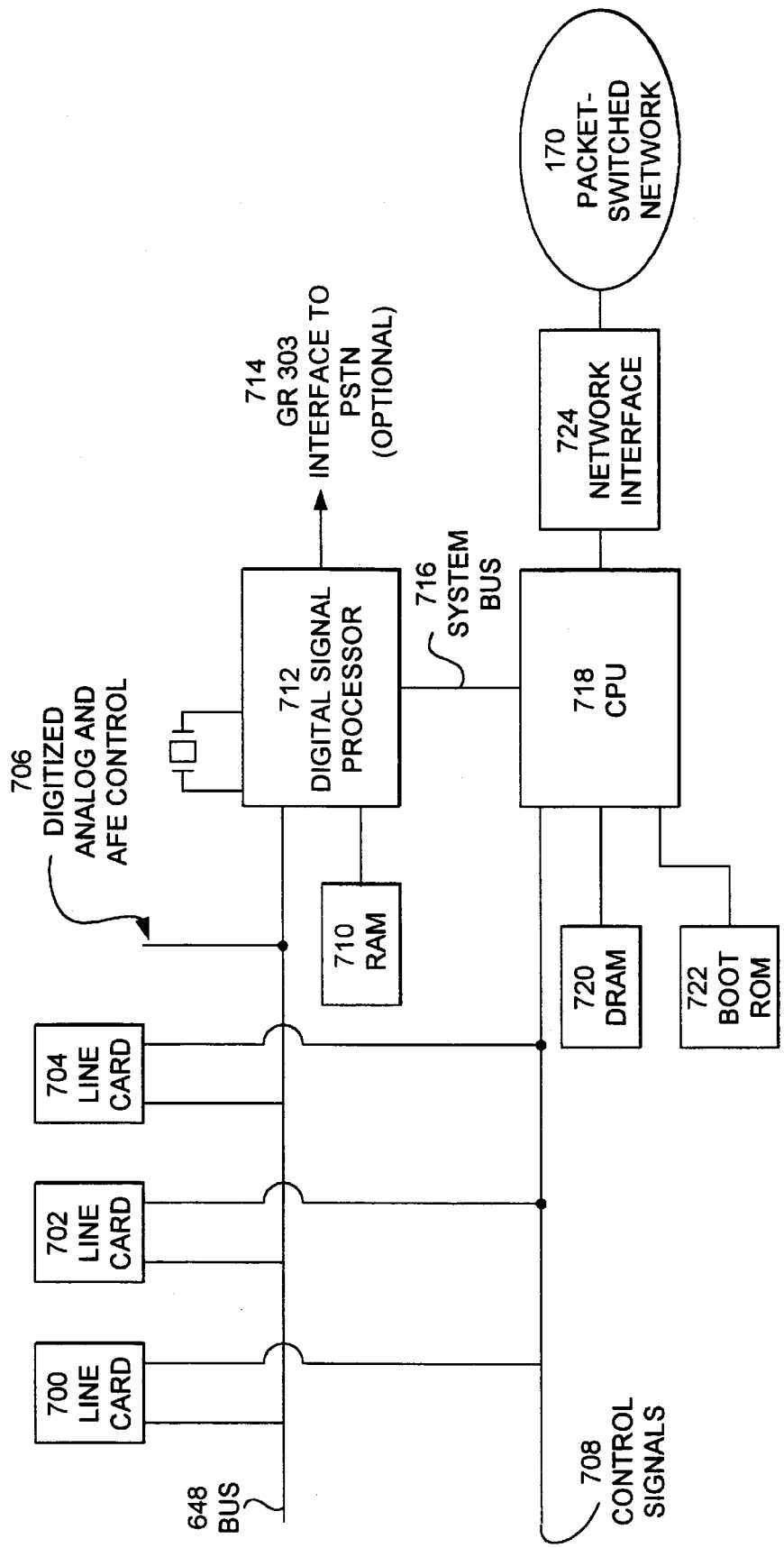
FIG. 7 is a block diagram illustrating the major functional components of a set of dual band bypass modems located on the central office side of subscriber loops in accordance with an aspect of the present invention.

FIG. 7 is a block diagram illustrating how line cards 700, 702 and 704 connect to digital signal processor 712 and CPU 718 to form a central site modem connecting to packet-switched network 170 in accordance with an aspect of the present invention. Line cards 700, 702 and 704 fit into bus 648 which feeds into digital signal processor 712. Digital signal processor 712 connects to RAM 710, and through system bus 716 to CPU 718. Digital signal processor 712 additionally connects through GR303 interface to PSTN 714, which is an optional connection to a public switch telephone network. CPU 718 connects to DRAM 720 as well as boot ROM 722, which contain code and data used by CPU 718. CPU 718 additionally connects to control signals 708 which feed directly into line cards 700, 702 and 704. CPU 718 also connects through network interface 724 to packet-switched network 170.

The system illustrated in FIG. 7 operates as follows. Connections from subscriber loops feed into line cards 700, 702 and 704. These pass through bus 648 into digital signal processor 712. Digital signal processor 712 performs the encoding and decoding processes required to implement modem communications through the subscriber loops which connect to line cards 700, 702 and 704. Digital signal processor 712 communicates with CPU 718 through system bus 716. From CPU 718, these communications feed through network interface 724 into packet-switched network 170. CPU 718 additionally provides control signals for line cards 700, 702 and 704.

Dual Band Facsimile Modems

Figure 8:
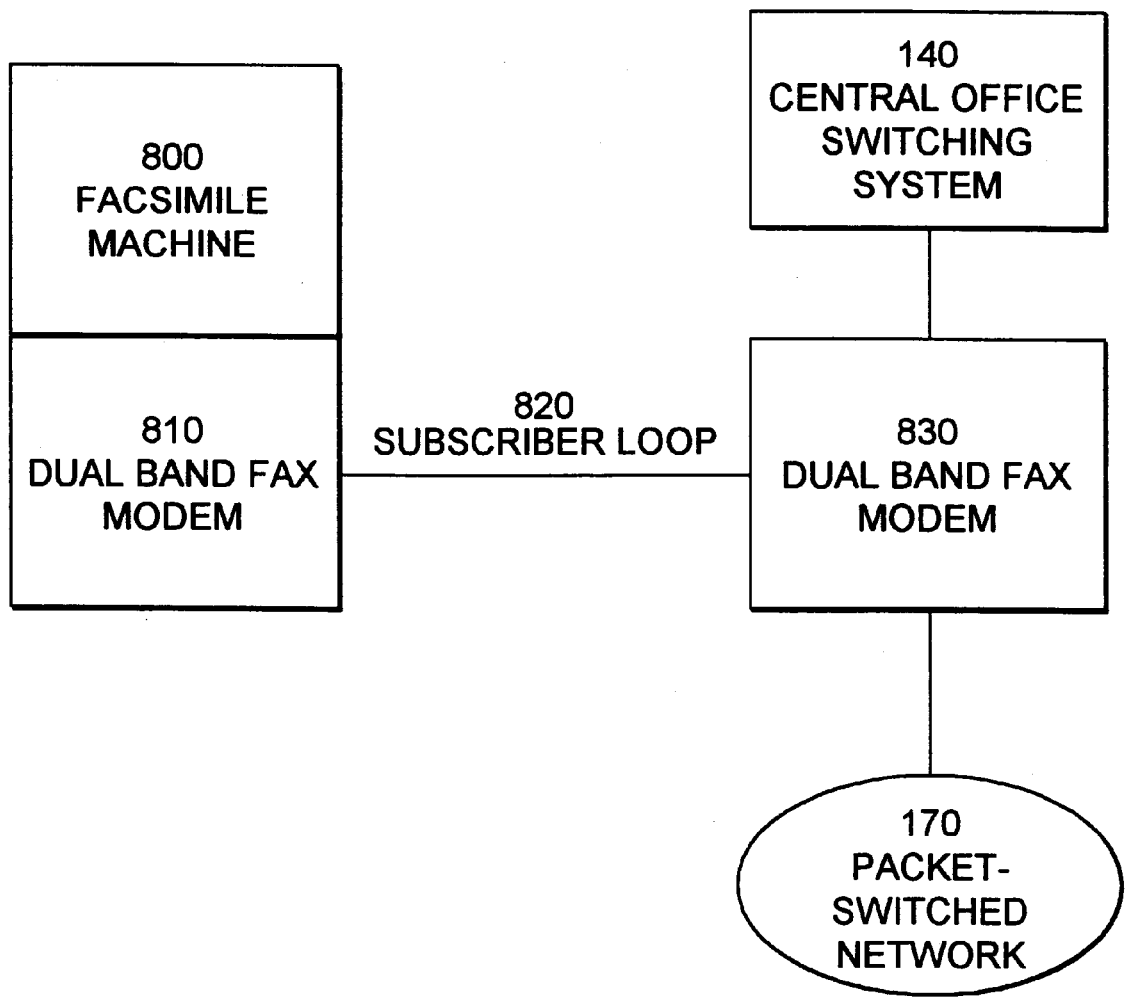
FIG. 8 is a block diagram illustrating how the present invention applies to facsimile modems in accordance with an aspect of the present invention.

FIG. 8 is a block diagram illustrating how dual band modems transmit and receive facsimile signals in accordance with an aspect of the present invention. Facsimile machine 800 contains dual band fax modem 810, which connects through subscriber loop 820 dual band bypass fax modem 830. Dual band bypass fax modem 830 switches subscriber loop 820 between central office switching system 140 and packet-switched network 170.

One embodiment of a dual band modem system for facsimile transmissions operates as follows. A FAX user appends a code (such as *123) to the front of the destination fax number. Dual band bypass fax modem 830 recognizes the prefix, and intercepts the call. Dual band bypass fax modem 830 next switches to an accelerated rate in its communications with dual band fax modem 810 through subscriber loop 820. The facsimile transmissions are then sent through packet-switched network 170, rather than through central office switching system 140, to a similar bypass modem near the destination facsimile machine for final delivery. Either one, both, or neither of the originating and destination facsimile machines has to be of the accelerated type.

At the physical level, data and facsimile modems are indistinguishable. The principal difference between the two is the communication session protocol. Facsimile modems support the protocols described by ITU specifications T.4, T.6 and T.30. Facsimile operation is half-duplex, whereas data modems are full-duplex. The facsimile modulation technique is specified by standards such as V.17 and V.29. For example, the common V.17 standard specifies a symbol rate of 2400 symbols per second.

The present invention applies to Group 3 facsimile machines using ITU standards T.4 and the included T.30 standard. The T.30 standard describes the procedures and handshake signals used when the facsimile equipment is operated over a PSTN. The T.30 standard divides facsimile operation into five phases:

Phase A: call establishment

Phase B: pre-message procedure

Phase C: message transmission

Phase D: post-message procedure

Phase E: release the call

In one embodiment of the present invention, a FAX call follows the T.30 procedure, with the accelerated capability option negotiated during the Phase B operation. Fast start tokens are also exchanged in Phase B. Ending session tokens are exchanged in Phase D.

Dual Band Modem Operation

Figure 9:
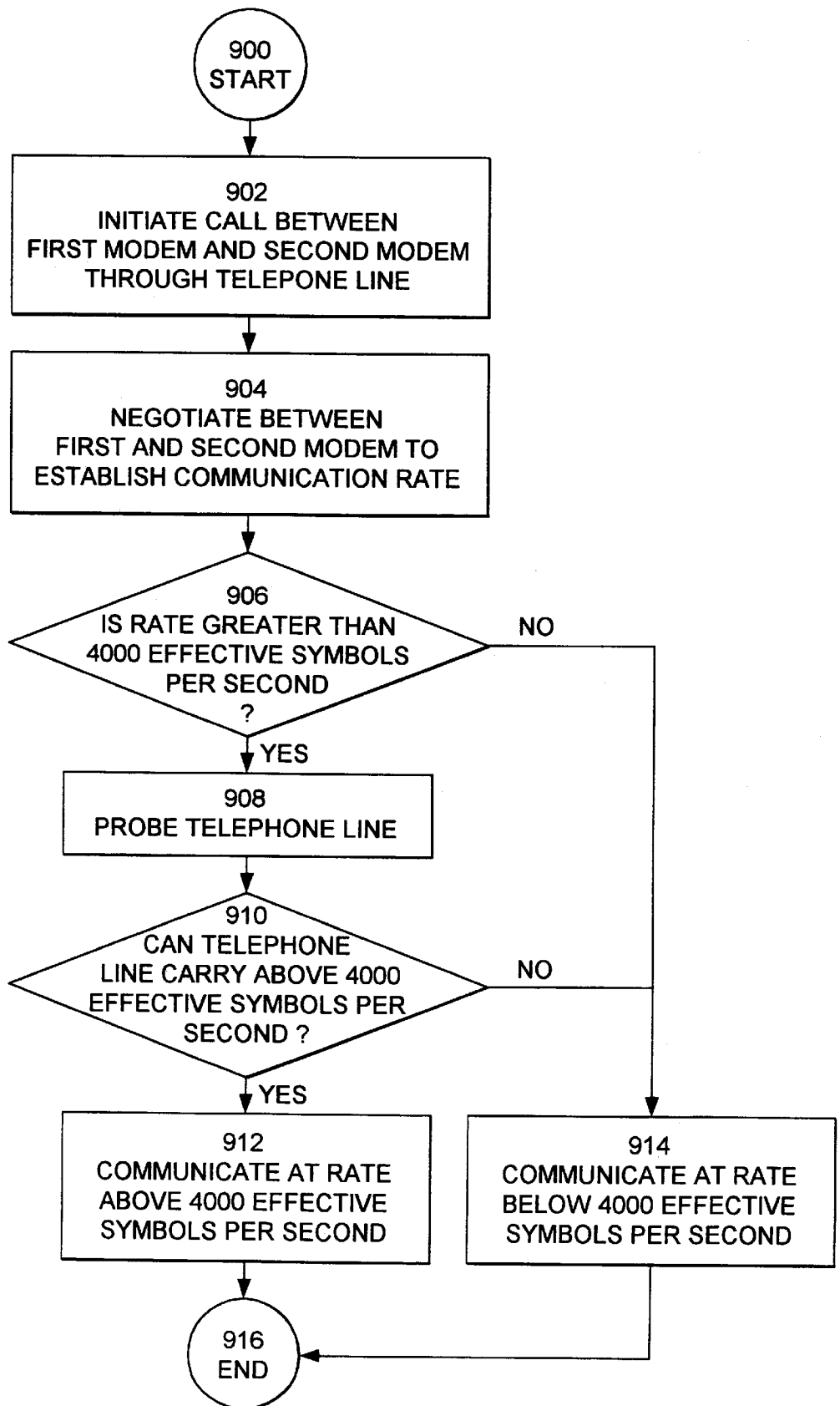
FIG. 9 is a flow chart illustrating the sequence of operations involved in establishing a communication session between dual band modems in accordance with an aspect of the present invention.

FIG. 9 is a flow chart illustrating the sequence of operations involved in establishing communications between two dual band modems in accordance with an aspect of the present invention. The system starts at step 900 which is a start state. The system next advances to step 902. At step 902, a telephone call is initiated between the first modem and the second modem through the telephone line. The system next advances to step 904. At step 904, negotiations take place between the first modem and the second modem to establish a communication rate between the first modem and the second modem. These negotiations may take place by means of a negotiation mechanism including any sequence of electrical signals on the telephone line. In one embodiment, this negotiation takes place through data sent in a modified V.8/bis exchange as is discussed above. (For facsimile modems, the negotiation takes place through a modified T.30 exchange as described above.) The system next advances to step 906. At step 906, the system asks whether the agreed upon communication rate is greater than 4,000 effective symbols per second. If not, the system advances to step 914. If so, the system advances to step 908. At step 908, the telephone line is probed to determine whether it is capable of carrying a high data rate. The system next advances to step 910. At step 910, the system asks whether the telephone line can accommodate above 4,000 effective symbols per second. If not, the system advances to step 914. If so, the system advances to step 912. At step 912, communications take place between the first modem and the second modem at an effective rate above 4,000 symbols per second. The system next advances to step 916 which is an end state. At step 914, either the first modem and the second modem have agreed on an effective symbol rate less than 4,000 symbols per second, or they have determined that the telephone line cannot carry communications at a high data rate. In this case, the first modem and the second modem communicate at a rate below 4,000 symbols per second. After the communications are complete, the system advances to step 916, which is an end state.

With ADSL modems, there is no need to retrain every connection because the channel between the modems is the same for all connections. In contrast, V.34 modems require several seconds of delay for training purposes before starting data service. With the modems according to the present invention, data service begins immediately after the connection is made when the accelerated mode is used.

In one embodiment, after the initial modified V.8 exchange, the modems know that they are both capable of accelerated performance. It is only necessary to pass a token between the modems to identify the continuation of a previous session. The channel characterization can therefore be skipped. In contrast, in the end-to-end case, both the end point modems and the channel can vary from one call to the next, and training is required for all connections.

In one embodiment, modems exchange their parameters, or a hash value of their parameters, at the end of each session. A new session begins with the exchange of the old parameters. If the two sets match, startup is immediate. If one end gets a match and the other end does not match, then the non-matching modem can adopt the other's version of the parameters. If both modems mismatch, retraining is initiated.

Figure 10:
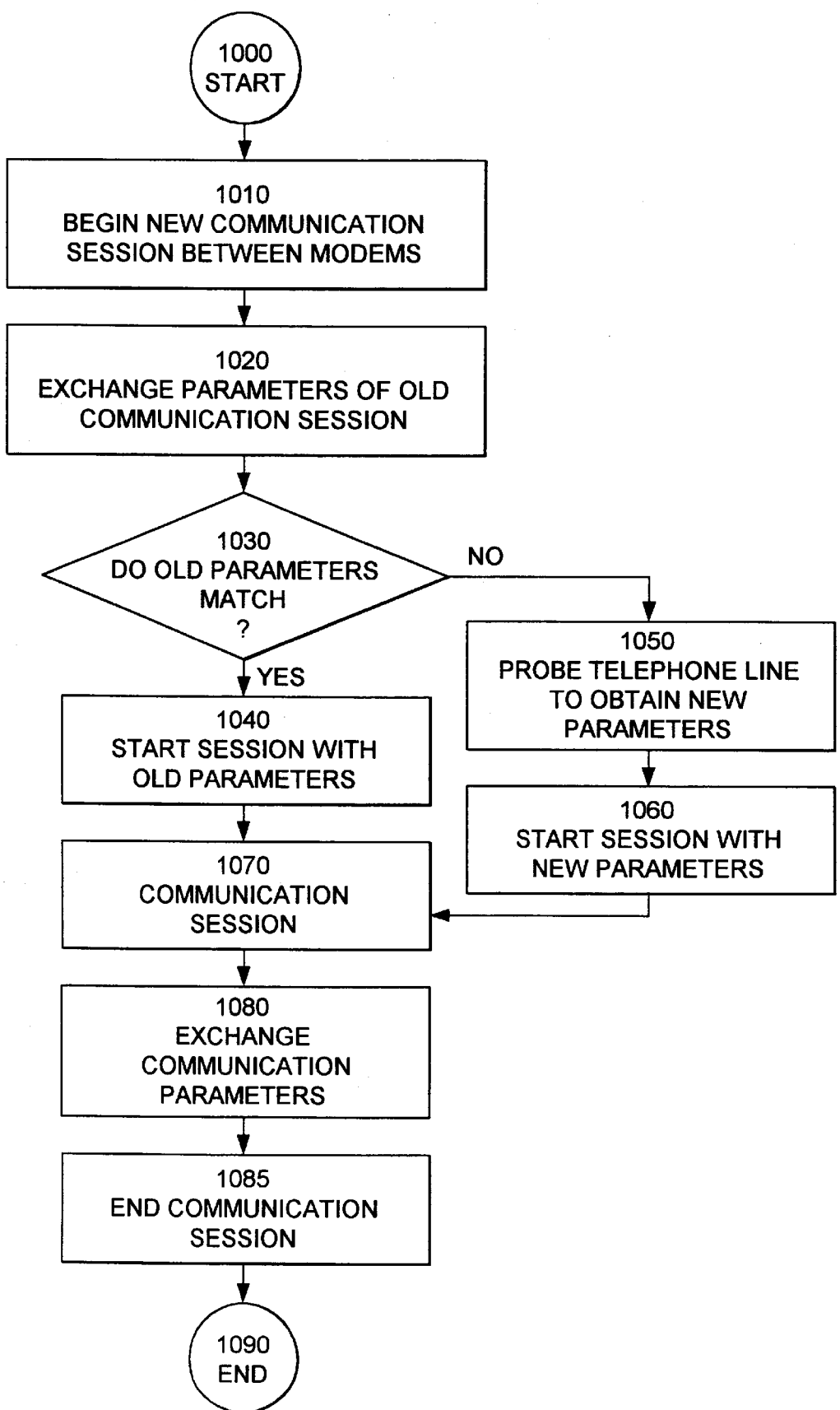
FIG. 10 is a flow chart illustrating how connection parameters from an old communication session can be reused for a new communication session between dual band modems in accordance with an aspect of the present invention.

FIG. 10 is a flow chart illustrating the sequence of operations involved in saving subscriber loop parameters of a prior communication session for use in a future communication session in accordance with an aspect of the present invention. The system starts at step 1000 which is a start state. The system advances to step 1010. At step 1010, a new communication session is initiated between two modems. The system next advances to step 1020. At step 1020, the modems exchange parameters of a prior communication session. The system next advances to step 1030. At step 1030, each modem examines its parameters to determine whether the parameters match. If not, the system advances to step 1050. If so, the system advances to step 1040. At step 1040, the parameters of the old session match, and the new communication session starts with these old parameters. The system next advances to step 1070. At step 1070, the communication session takes place. At step 1050, the parameters from the old communication session did not match. Consequently, the telephone line is probed to obtain new parameters. The system next advances to step 1060. At step 1060, the communication session starts with the new parameters. The system next advances to step 1070, in which the communication session takes place. After the communication session is complete, the system advances to step 1080. At step 1080, the modems exchange communication parameters for a future communication session. The system next advances to step 1085 in which the communication session is terminated. The system next advances to step 1090, which is an end state.

Figure 11:
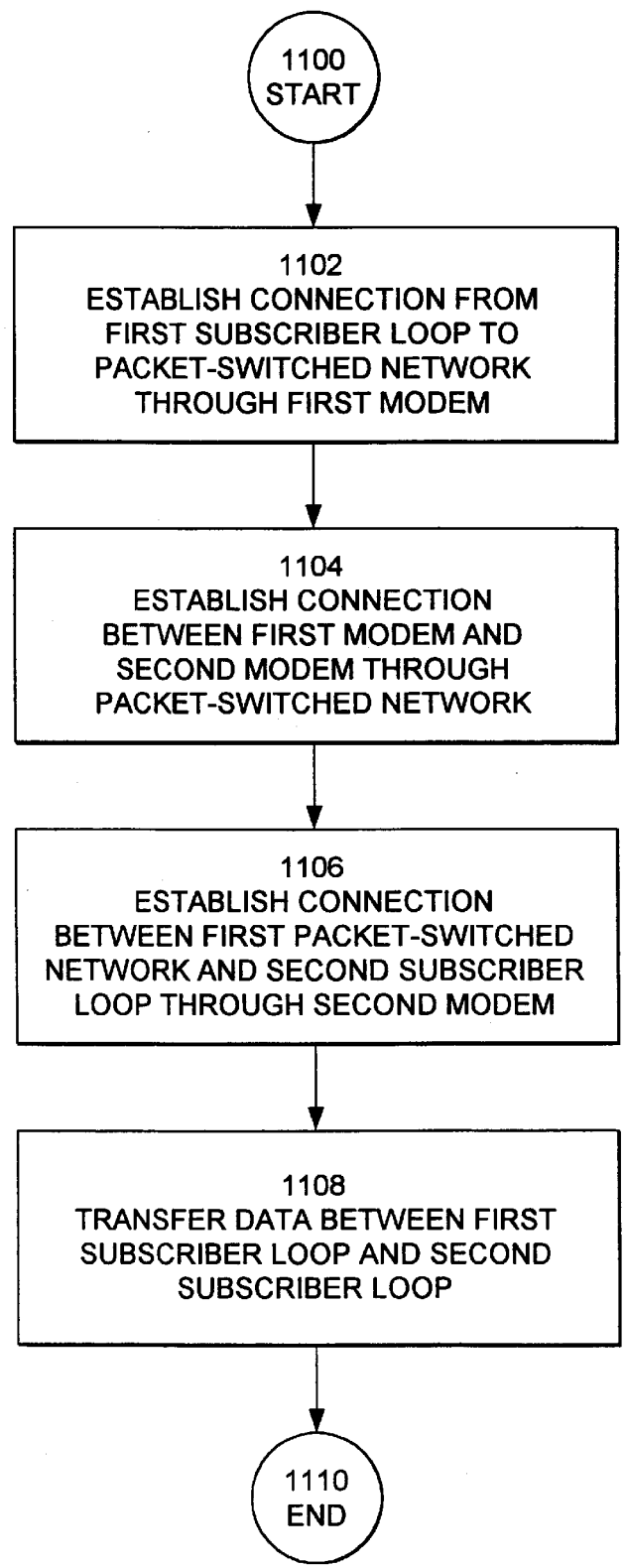
FIG. 11 is a flow chart illustrating how a communication session is established between two subscriber loops through a packet-switched network in accordance with an aspect of the present invention.

FIG. 11 is a flow chart illustrating the sequence of operations involved in routing communications between a first subscriber loop and a second subscriber loop through a packet-switched network in accordance with an aspect of the present invention. The system begins at step 1100 which is a start state. The system next advances to step 1102. At step 1102, a connection is established from the first subscriber loop to the packet-switched network through the first modem. The system next advances to step 1104. At step 1104, a connection is established between the first modem and the second modem through the packet-switched network. The system next advances to step 1106. At step 1106, a connection is established between the packet-switched network and the second subscriber loop through a second modem. The system next advances to step 1108. At step 1108, data is transferred between the first subscriber loop and the second subscriber loop through the newly established connection through the first modem, the packet-switched network and the second modem. The system next advances to step 1110, which is an end state.

Figure 12:
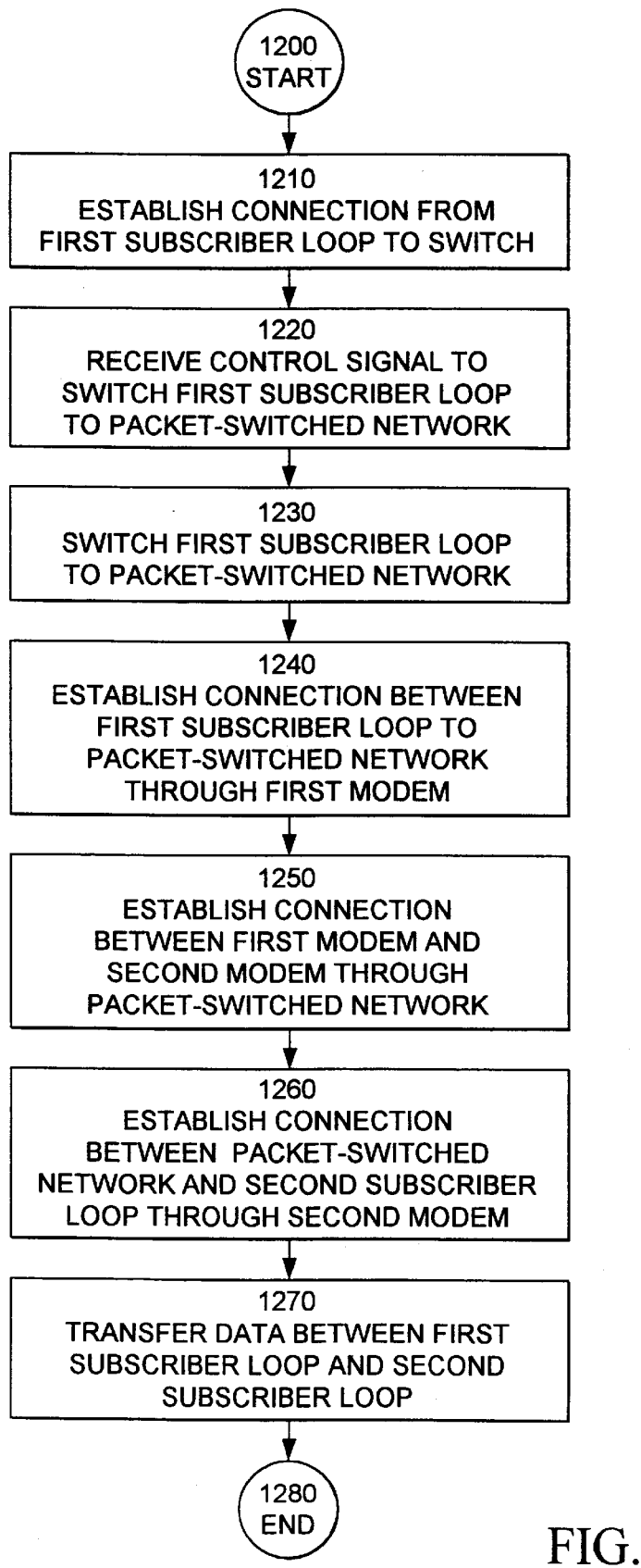
FIG. 12 is a flow chart illustrating the sequence of operations involved in using a bypass modem to establish a connection between two subscriber loops through a packet-switched network in accordance with an aspect of the present invention.

FIG. 12 is a flow chart illustrating the sequence of operations involved in transferring data between a first subscriber loop and a second subscriber loop through a bypass modem and a packet-switched network in accordance with an aspect of the present invention. The system begins at step 1200 which is a start state. The system next advances to step 1210. At step 1210, a connection is established from the first subscriber loop to a switch in the bypass modem. The system next advances to step 1220. At step 1220, the switch receives a control signal to switch the first subscriber loop to the packet-switched network. This control signal may originate from a number of different locations and may take a number of different forms as disclosed in preceding portions of this specification. The system next advances to step 1230. At step 1230, the first subscriber loop is switched so that it connects to the packet-switched network. The system next advances to step 1240. At step 1240, a connection is established from the first subscriber loop to the packet-switched network through the first modem. The system next advances to step 1250. At step 1250, a connection is established between the first modem and the second modem through the packet-switched network. The system next advances to step 1260. At step 1260, a connection is established between the packet-switched network and the second subscriber loop through the second modem. The system next advances to step 1270. At step 1270, data is transferred from the first subscriber loop to the second subscriber loop through the first modem, the packet-switched network and the second modem. The system next advances to step 1280, which is an end state.

Figure 13:
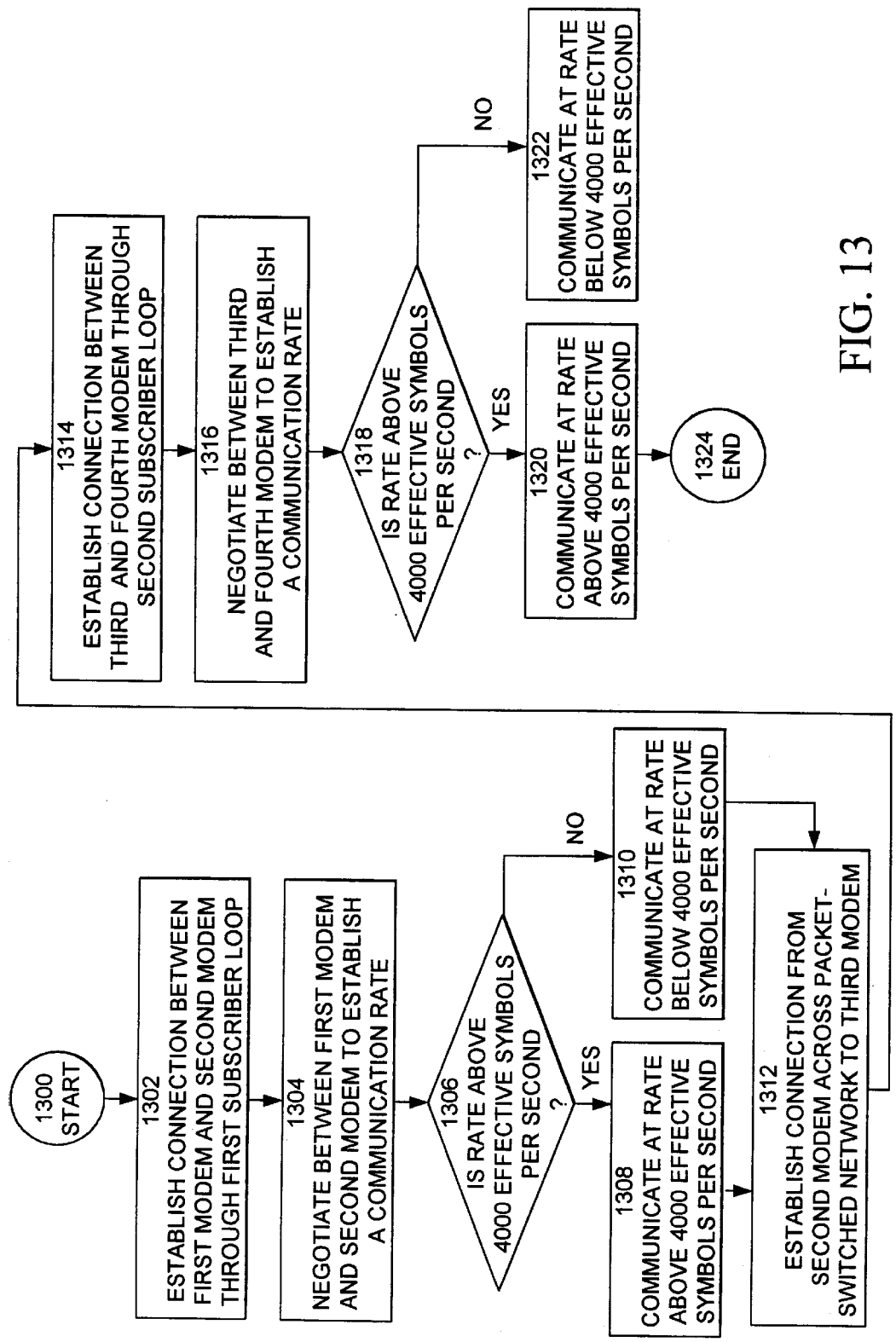
FIG. 13 illustrates the sequence of operations involved in establishing a connection between subscriber loops through a packet-switched network using dual band modems in accordance with an aspect of the present invention.

FIG. 13 is a flow chart illustrating the operation of two dual band modems which are used to establish a connection between two subscriber loops through a packet-switched network in accordance with an aspect of the present invention. The transfer data rate switching system begins at step 1300, which is a start state. The system next advances to step 1302. At step 1302, a connection is established between a first modem and a second modem through a first subscriber loop. The system next advances to step 1304. At step 1304, negotiations take place between the first modem and the second modem to establish an agreed-upon communication rate. The system next advances to step 1306. At step 1306, the system asks whether the agreed-upon communication rate is above 4,000 effective symbols per second. If not, the system advances to step 1310 in which the modems communicate with each other at a rate below 4,000 effective symbols per second. The system next advances to step 1312. If so, the system advances to step 1308. At step 1308, the modems communicate at a rate above 4,000 effective symbols per second across the first subscriber loop. The system next advances to step 1312. At step 1312, a connection is established from the second modem across a packet-switched network to a third modem. The system next advances to step 1314. At step 1314, a connection is established between the third modem and a fourth modem through a second subscriber loop. The system next advances to step 1316. At step 1316, negotiations take place between the third modem and the fourth modem to establish an agreed-upon communication rate. The system next advances to step 1318. At step 1318, the system asks whether the agreed upon rate is above 4,000 effective symbols per second. If not, the system advances to step 1322 in which the third modem and the fourth modem communicate at a rate below 4,000 effective symbols per second. The system next advances to step 1324 which is an end state. If the agreed-upon rate was above 4000 effective symbols per second, the system advances to step 1320. At step 1320, the modems communicate at a rate above 4,000 effective symbols per second. The system next advances to step 1324, which is an end state.

Note that the operations in FIG. 12 and FIG. 13 can be combined into an embodiment which uses a dual band bypass modem to establish a connection from a first subscriber loop to a second subscriber loop. This embodiment combines the bypassing functions of step 1220 and step 1230 with the rate negotiation functions of steps 1304 and 1316.

The foregoing description of an embodiment of the present invention has been presented for purposes of illustration and description only. It is not intended to be exhaustive or to limit the invention to the forms disclosed. Obviously, many modifications and variations will be apparent to practitioners skilled in the art.

What is claimed is:

1. An apparatus for transmitting data over a telephone line, comprising:
    a telephone line interface coupled to the telephone line;
    a communication circuit coupled to the telephone line interface, the communication circuit including circuitry to communicate at an effective symbol rate below 8,000 symbols per second, and the communication circuit including circuitry to communicate at an effective symbol rate above 8,000 symbols per second through the telephone line interface;
    a negotiation mechanism coupled to the telephone line interface including a mechanism to negotiate with a remote modem coupled to the telephone line to determine whether to communicate with the remote modem at an effective symbol rate above 8,000 symbols per second; and
    a transfer rate switching system coupled to the communication circuit and the negotiation mechanism, including a mechanism to switch the communication circuit between an effective symbol rate below 8,000 symbols per second, and an effective symbol rate above 8,000 symbols per second.

2. The apparatus of claim 1, wherein the apparatus does not include circuitry to communicate using an ISDN protocol.

3. The apparatus of claim 1, wherein:
    if the communication circuit communicates on a plurality of orthogonal channels on a single physical channel, the effective symbol rate is equal to the summation of the symbol rates across the plurality of orthogonal channels; and
    if the communication circuit communicates on a single physical channel, the effective symbol rate is equal to the symbol rate for the single channel.

4. The apparatus of claim 1, wherein the communication circuit is used to communicate facsimile signals with the remote modem.

5. The apparatus of claim 1, including a line probing mechanism coupled to the telephone line interface, the line probing mechanism including resources to determine if the telephone line is capable of passing information at an effective symbol rate above 8,000 symbols per second.

6. The apparatus of claim 1, including a mechanism coupled to the telephone line interface that exchanges information with the remote modem to identify a continuation of a previous communication session with the remote modem.

7. The apparatus of claim 1, including a mechanism coupled to the telephone line interface that exchanges information with the remote modem to identify a continuation of a previous communication session with the remote modem, the mechanism including:
    a mechanism that exchanges identifying information for old parameters of an old communication session at the end of the old communication session;
    a mechanism that starts a new communication session by exchanging the identifying information for the old parameters, so that if the old parameters match, the new communication session starts with the old parameters, and if the old parameters mismatch the connection between the first modem and the second modem is retrained to produce new parameters for the new communication session.

8. The apparatus of claim 1, including a mechanism to probe the communication channel to determine modulation parameters for communications across the communication channel.

9. The apparatus of claim 1, including a mechanism to train a connection between the first modem and the second modem for echo cancellation and equalization.

10. The apparatus of claim 1, wherein the communication circuit includes:
    a modulating circuit;
    a demodulating circuit;
    a digital-to-analog converter; and
    an analog-to-digital converter.

11. The apparatus of claim 1, wherein the negotiation mechanism facilitates a modified V.8 exchange with the remote modem to determine whether to communicate with the remote modem at an effective symbol rate above 8,000 symbols per second.

12. The apparatus of claim 1, wherein the telephone line includes a subscriber loop.

13. The apparatus of claim 1, wherein the telephone line includes a connection through a telephone switching system.

14. An apparatus for transmitting data over a telephone line, comprising:
    a telephone line interface coupled to the telephone line;
    a communication circuit coupled to the telephone line interface, the communication circuit including circuitry to communicate at a rate below 64,000 bits per second, and the communication circuit including circuitry to communicate at a rate above 64,000 bits per second through the telephone line interface;
    a negotiation mechanism coupled to the telephone line interface including a mechanism to negotiate with a remote modem coupled to the telephone line to determine whether to communicate with the remote modem at a rate above 64,000 bits per second; and a transfer rate switching system coupled to the communication circuit and the negotiation mechanism, including a mechanism to switch the communication circuit between a rate below 64,000 bits per second, and a rate above 64,000 symbols per second.

15. An apparatus for transmitting data over a telephone line, comprising:

a telephone line interface coupled to the telephone line;

a communication circuit coupled to the telephone line interface, the communication circuit including circuitry to communicate using both a V.34/56K protocol and an ISDN protocol through the telephone line interface;

a negotiation mechanism coupled to the telephone line interface including a mechanism to negotiate with a remote modem coupled to the telephone line to determine whether to communicate with the remote modem using the V.34/56K protocol or the ISDN protocol; and a transfer rate switching mechanism coupled to the communication circuit and the negotiation mechanism, including a mechanism to switch the communication circuit between the V.34/56K protocol and the ISDN protocol.

16. An apparatus for transmitting data over a telephone line and a packet-switched network, comprising:

a telephone line interface coupled to the telephone line;

a network interface coupled to the packet-switched network;

a communication circuit coupled to the telephone line interface and the network interface, the communication circuit communicating at an effective symbol rate below 4,000 symbols per second, or an effective symbol rate above 4,000 symbols per second through the telephone line interface;

a negotiation mechanism coupled to the telephone line interface for negotiating with a remote modem coupled to the telephone line to determine whether to communicate with the remote modem at an effective symbol rate above 4,000 symbols per second;

a transfer rate switching system coupled to the communication circuit and the negotiation mechanism for switching the communication circuit between an effective symbol rate below 4,000 symbols per second and an effective symbol rate above 4,000 symbols per second; and a mechanism that converts between analog circuit-based data on the telephone line and digital packet-based data on the packet-switched network.

17. The apparatus of claim 16, wherein the apparatus does not include circuitry to communicate using an ISDN protocol.

18. The apparatus of claim 16, including a switch coupled to a central office switching system, and coupled between the telephone line interface and the communication circuit for switching the telephone line between the central office switching system and the packet-switched network.

19. The apparatus of claim 16, wherein the communication circuit is used to communicate facsimile signals with the remote modem.

20. An apparatus for transmitting data over a telephone line and a packet-switched network, comprising:

telephone line interface coupled to the telephone line;

a network interface coupled to the packet-switched network;

a communication circuit coupled to the telephone line interface and the network interface, the communication circuit communicating at an effective symbol rate below 8,000 symbols per second, or an effective symbol rate above 8,000 symbols per second through the telephone line interface;

a negotiation mechanism coupled to the telephone line interface for negotiating with a remote modem coupled to the telephone line to determine whether to communicate with the remote modem at an effective symbol rate above 8,000 symbols per second; and a transfer rate switching system coupled to the communication circuit and the negotiation mechanism for switching the communication circuit between an effective symbol rate below 8,000 symbols per second and an effective symbol rate above 8,000 symbols per second.

21. An apparatus for transmitting data over a telephone line and a packet-switched network, comprising:

a telephone line interface coupled to the telephone line;

a network interface coupled to the packet-switched network;

a communication circuit coupled to the telephone line interface and the network interface, the communication circuit communicating at a rate below 64,000 bits per second, or a rate above 64,000 bits per second through the telephone line interface;

a negotiation mechanism coupled to the telephone line interface for negotiating with a remote modem coupled to the telephone line to determine whether to communicate with the remote modem at a rate above 64,000 bits per second; and a transfer rate switching system coupled to the communication circuit and the negotiation mechanism for switching the communication circuit between a rate below 64,000 bits per second and a rate above 64,000 bits per second.

22. An apparatus for transmitting data over a telephone line and a packet-switched network, comprising:

a telephone line interface coupled to the telephone line;

a network interface coupled to the packet-switched network;

a communication circuit coupled to the telephone line interface and the network interface, the communication circuit communicating using both a V.34/56K protocol and an ISDN protocol through the telephone line interface;

a negotiation mechanism coupled to the telephone line interface for negotiating with a remote modem coupled to the telephone line to determine whether to communicate with the remote modem using the V.34/56K protocol or the ISDN protocol; and a transfer rate switching mechanism coupled to the communication circuit and the negotiation mechanism for switching the communication circuit between the V.34/56K protocol and the ISDN protocol.

23. An apparatus for transmitting data over a plurality of telephone lines and a packet-switched network, comprising:

a plurality of telephone line interfaces coupled to the plurality of telephone lines;

a network interface coupled to a packet-switched network;

a plurality of communication circuits coupled to respective telephone line interfaces in the plurality of telephone line interfaces and the network interface, communication circuits in the plurality of communication circuits including circuitry to communicate at an effective symbol rate below 4,000 symbols per second, and communication circuits in the plurality of communication circuits including circuitry to communicate at an effective symbol rate above 4,000 symbols per second through to the telephone line interface;

at least one negotiation mechanism coupled to telephone lines in the plurality of telephone line interfaces for negotiation with a plurality of remote modems coupled to the plurality of telephone lines to determine whether to communicate with remote modems in the plurality of remote modems at an effective symbol rate above 4,000 symbols per second;

at least one transfer rate switching system coupled to communication circuits in the plurality of communication circuits and to at least one negotiation mechanism, including a mechanism to switch the plurality of communication circuits between an effective symbol rate below 4,000 symbols per second and an effective symbol rate above 4,000 symbols per second; and a mechanism that converts between analog circuit-based data on telephone lines in the plurality of telephone lines and digital packet-based data on the packet-switched network.

24. The apparatus of claim 23, wherein the apparatus does not include circuitry to communicate using an ISDN protocol.

25. The apparatus of claim 23, including a switch coupled to a central office switching system, and coupled between the plurality of telephone line interfaces and the plurality of communication circuits for switching telephone lines in the plurality of telephone lines between the central office switching system and the packet-switched network.

26. The apparatus of claim 23, wherein communication circuits in the plurality of communication circuits are used to communicate facsimile signals with remote modems in the plurality of remote modems.

27. A method for transmitting data across a telephone line between a first modem and a second modem, the telephone line being coupled to the first modem and the second modem, the method comprising:

establishing a connection between the first modem and the second modem through the telephone line;

negotiating between the first modem and the second modem through the connection to establish an agreed-upon communication rate;

if the agreed-upon communication rate is below 8,000 effective symbols per second, communicating between the first modem and the second modem across the telephone line at a rate below 8,000 effective symbols per second; and if the agreed-upon communication rate is above 8,000 effective symbols per second, communicating between the first modem and the second modem across the telephone line at a rate above 8,000 effective symbols per second.

28. The method of claim 27, wherein the communicating between the first modem and the second modem does not involve an ISDN protocol.

29. The method of claim 27, wherein communications between the first modem and the second modem across the telephone line include facsimile signals.

30. The method of claim 27, including the step of probing the telephone line to determine if the telephone line is capable of passing information at greater than 8,000 effective symbols per second.

31. The method of claim 27, including the step of exchanging information between the first modem and the second modem to identify a continuation of a previous communication session between the first modem and the second modem.

32. The method of claim 27, including the step of exchanging information between the first modem and the second modem to identify a continuation of a previous communication session between the first modem and the second modem, wherein the step of exchanging information includes:

exchanging identifying information for old parameters of an old communication session at the end of the old communication session;

starting a new communication session by exchanging the identifying information for the old parameters;

if the old parameters match, starting a new session with the old parameters;

if the old parameters mismatch, retraining the connection between the first modem and the second modem.

33. The method of claim 27, including the step of probing the communication channel to determine modulation parameters for communications across the communication channel.

34. The method of claim 27, including the step of training a connection between the first modem and the second modem for echo cancellation and equalization.

35. The method of claim 27, wherein the step of communicating between the first modem and the second modem across the telephone line at a rate below 8,000 effective symbols per second and the step of communicating between the first modem and the second modem across the telephone line at a rate above 8,000 effective symbols per second, include the steps of:

modulating a signal;

demodulating a signal;

converting an analog signal to a digital signal; and converting a digital signal to an analog signal.

36. The method of claim 27, wherein the step of negotiating performs a modified V.8 exchange between the first modem and the second modem to determine whether to communicate between the first modem and the second modem at an effective symbol rate above 8,000 symbols per second.

37. The method of claim 27, wherein the telephone line includes a subscriber loop.

38. The method of claim 27, wherein the telephone line includes a connection through a telephone switching system.

39. The method of claim 27, wherein the second modem is coupled to a packet-switched network, and including the step of establishing a connection from the second modem through the packet-switched network.

40. A method for transmitting data across a telephone line between a first modem and a second modem, the telephone line being coupled to the first modem and the second modem, the method comprising:

establishing a connection between the first modem and the second modem through the telephone line;

negotiating between the first modem and the second modem through the connection to establish an agreed-upon communication rate;

if the agreed-upon communication rate is below 64,000 bits per second, communicating between the first modem and the second modem across the telephone line at a rate below 64,000 bits per second; and if the agreed-upon communication rate is above 64,000 bits per second, communicating between the first modem and the second modem across the telephone line at a rate above 64,000 bits per second.

41. A method for transmitting data across a telephone line between a first modem and a second modem, the telephone line being coupled to the first modem and the second modem, the method comprising:

establishing a connection between the first modem and the second modem through the telephone line;

negotiating between the first modem and the second modem through the connection to establish an agreed-upon communication protocol;

if the agreed-upon communication protocol is a V.34/56K protocol, communicating between the first modem and the second modem across the telephone line using a V.34/56K protocol; and if the agreed-upon communication protocol is an ISDN protocol, communicating between the first modem and the second modem across the telephone line using the ISDN protocol.

42. A method for transmitting data across a telephone line and for bypassing a central office switching system, the method operating in a system including, a first modem coupled to the telephone line, a switch coupled to the telephone line, a central office switching system, and a second modem, the second modem coupled to a packet-switched network, the method comprising the steps of:

establishing a connection between the telephone line and the switch;

receiving a control signal to switch the telephone line to the packet-switched network;

switching the telephone line to the packet-switched network through the second modem in response to the control signal;

exchanging information between the first modem and the second modem through the telephone line to establish an agreed-upon communication rate;

if the agreed-upon communication rate is below 4,000 effective symbols per second, communicating between the first modem and the second modem across the telephone line at a rate below 4,000 effective symbols per second;

if the agreed-upon communication rate is above 4,000 effective symbols per second, communicating between the first modem and the second modem across the telephone line at a rate above 4,000 effective symbols per second;

establishing a connection from the second modem through the packet-switched network; and converting between analog circuit-based data on the telephone line and digital packet-based data on the packet-switched network.

43. The method of claim 42, wherein the communicating between the first and second modem does not involve an ISDN protocol.

44. The method of claim 42, wherein communications between the first modem and the second modem across the communication channel include facsimile signals.

45. An apparatus for transmitting data over a telephone line, comprising:

a telephone line interface coupled to the telephone line;

a communication circuit coupled to the telephone line interface, the communication circuit including circuitry to communicate at an effective symbol rate below 8,000 symbols per second, and the communication circuit including circuitry to communicate at an effective symbol rate above 8,000 symbols per second through the telephone line interface;

a negotiation mechanism coupled to the telephone line interface including a mechanism to negotiate with a remote modem coupled to the telephone line to determine whether to communicate with the remote modem at an effective symbol rate above 8,000 symbols per second; and a transfer rate switching system coupled to the communication circuit and the negotiation mechanism, including a mechanism to switch the communication circuit between an effective symbol rate below 8,000 symbols per second, and an effective symbol rate above 8,000 symbols per second, the telephone line includes a subscriber loop.

46. The apparatus of claim 45, including a line probing mechanism coupled to the telephone line interface, the line probing mechanism including resources to determine if the telephone line is capable of passing information at an effective symbol rate above 8,000 symbols per second and the second modem across the communication channel include facsimile signals.

47. The apparatus of claim 45, including a mechanism coupled to the telephone line interface that exchanges information with the remote modem to identify a continuation of a previous communication session with the remote modem.

48. The apparatus of claim 45, including a mechanism coupled to the telephone line interface that exchanges information with the remote modem to identify a continuation of a previous communication session with the remote modem, the mechanism including:

a mechanism that exchanges identifying information for old parameters of an old communication session at the end of the old communication session;

a mechanism that starts a new communication session by exchanging the identifying information for the old parameters, so that if the old parameters match, the new communication session starts with the old parameters, and if the old parameters mismatch the connection between the first modem and the second modem is retrained to produce new parameters for the new communication session.

49. The apparatus of claim 45, wherein the communication circuit includes:

a modulating circuit;

a demodulating circuit;

a digital-to-analog converter; and an analog-to-digital converter.

50. The apparatus of claim 45, wherein the negotiation mechanism facilitates a modified V.8 exchange with the remote modem to determine whether to communicate with the remote modem at an effective symbol rate above 8,000 symbols per second.

51. An apparatus for transmitting data over a telephone line and a packet-switched network, comprising:

a telephone line interface coupled to the telephone line; network interface coupled to the packet-switched network;

a communication circuit coupled to the telephone line interface and the network interface, the communication circuit communicating at an effective symbol rate below 4,000 symbols per second, or an effective symbol rate above 4,000 symbols per second through the telephone line interface;

a negotiation mechanism coupled to the telephone line interface for negotiating with a remote modem coupled to the telephone line to determine whether to communicate with the remote modem at an effective symbol rate above 4,000 symbols per second;

a transfer rate switching system coupled to the communication circuit and the negotiation mechanism for switching the communication circuit between an effective symbol rate below 4,000 symbols per second and an effective symbol rate above 4,000 symbols per second;

a mechanism that converts between analog circuit-based data on the telephone line and digital packet-based data on the packet-switched network; and a switch coupled to a central office switching system, and coupled between the telephone line interface and the communication circuit for switching the telephone line between the central office switching system and the packet-switched network.

52. An apparatus for transmitting data over a plurality of telephone lines and a packet-switched network, comprising:

a plurality of telephone line interfaces coupled to the plurality of telephone lines;

a network interface coupled to a packet-switched network;

a plurality of communication circuits coupled to respective telephone line interfaces in the plurality of telephone line interfaces and the network interface, communication circuits in the plurality of communication circuits including circuitry to communicate at an effective symbol rate below 4,000 symbols per second, and communication circuits in the plurality of communication circuits including circuitry to communicate at an effective symbol rate above 4,000 symbols per second through to the telephone line interface;

at least one negotiation mechanism coupled to telephone lines in the plurality of telephone line interfaces for negotiation with a plurality of remote modems coupled to the plurality of telephone lines to determine whether to communicate with remote modems in the plurality of remote modems at an effective symbol rate above 4,000 symbols per second;

at least one transfer rate switching system coupled to communication circuits in the plurality of communication circuits and to at least one negotiation mechanism, including a mechanism to switch the plurality of communication circuits between an effective symbol rate below 4,000 symbols per second and an effective symbol rate above 4,000 symbols per second;

a mechanism that converts between analog circuit-based data on telephone lines in the plurality of telephone lines and digital packet-based data on the packet-switched network; and a switch coupled to a central office switching system, and coupled between the plurality of telephone line interfaces and the plurality of communication circuits for switching telephone lines in the plurality of telephone lines between the central office switching system and the packet-switched network.

53. A method for transmitting data across a telephone line between a first modem and a second modem, the telephone line being coupled to the first modem and the second modem, the method comprising:

establishing a connection between the first modem and the second modem through the telephone line;

negotiating between the first modem and the second modem through the connection to establish an agreed-upon communication rate;

if the agreed-upon communication rate is below 8,000 effective symbols per second, communicating between the first modem and the second modem across the telephone line at a rate below 8,000 effective symbols per second; and if the agreed-upon communication rate is above 8,000 effective symbols per second, communicating between the first modem and the second modem across the telephone line at a rate above 8,000 effective symbols per second, wherein the telephone line includes a subscriber loop.

54. The method of claim 53, wherein the communicating between the first modem and the second modem does not involve an ISDN protocol.

55. The method of claim 53, including the step of probing the telephone line to determine if the telephone line is capable of passing information at greater than 8,000 effective symbols per second.

56. The method of claim 53, including the step of exchanging information between the first modem and the second modem to identify a continuation of a previous communication session between the first modem and the second modem.

57. The method of claim 53, including the step of exchanging information between the first modem and the second modem to identify a continuation of a previous communication session between the first modem and the second modem, wherein the step of exchanging information includes:

exchanging identifying information for old parameters of an old communication session at the end of the old communication session;

starting a new communication session by exchanging the identifying information for the old parameters;

if the old parameters match, starting a new session with the old parameters; and if the old parameters mismatch, retraining the connection between the first modem and the second modem.

58. The method of claim 53, wherein the step of communicating between the first modem and the second modem across the telephone line at a rate below 8,000 effective symbols per second and the step of communicating between the first modem and the second modem across the telephone line at a rate above 8,000 effective symbols per second, include the steps of:

modulating a signal;

demodulating a signal;

converting an analog signal to a digital signal; and converting a digital signal to an analog signal.

59. The method of claim 53, wherein the step of negotiating performs a modified V.8 exchange between the first modem and the second modem to determine whether to communicate between the first modem and the second modem at an effective symbol rate above 8,000 symbols per second.

60. A method for transmitting data across a telephone line and for bypassing a central office switching system, the method operating in a system including, a first modem coupled to the telephone line, a switch coupled to the telephone line, a central office switching system, and a second modem, the second modem coupled to a packet-switched network, the method comprising the steps of:

establishing a connection between the telephone line and the switch;

receiving a control signal to switch the telephone line to the packet-switched network;

switching the telephone line to the packet-switched network through the second modem in response to the control signal;

exchanging information between the first modem and the second modem through the telephone line to establish an agreed-upon communication rate;

if the agreed-upon communication rate is below 4,000 effective symbols per second, communicating between the first modem and the second modem across the telephone line at a rate below 4,000 effective symbols per second;

if the agreed-upon communication rate is above 4,000 effective symbols per second, communicating between the first modem and the second modem across the telephone line at a rate above 4,000 effective symbols per second;

establishing a connection from the second modem through the packet-switched network; and converting between analog circuit-based data on the telephone line and digital packet-based data on the packet-switched network, wherein the communicating between the first and second modem does not involve an ISDN protocol.

61. An apparatus for transmitting data over a telephone line, comprising:

an interface means coupled to the telephone line;

a communication means coupled to the interface means, the communication means for communicating at an effective symbol rate below 8,000 symbols per second, or at an effective symbol rate above 8,000 symbols per second through the interface means;

a negotiation means coupled to the interface means for negotiating with a remote modem coupled to the telephone line to determine whether to communicate with the remote modem at an effective symbol rate above 8,000 symbols per second; and a switching means coupled to at least one of the communication circuit and the negotiation mechanism, for switching the communication means between an effective symbol rate below 8,000 symbols per second, and an effective symbol rate above 8,000 symbols per second.

* * * * *